_(12)_ United States Patent
Hodge

(10) Patent No.: US 10,966,090 B2
(45) Date of Patent: *Mar. 30, 2021

(54) UNIFIED ENTERPRISE MANAGEMENT OF WIRELESS DEVICES IN A CONTROLLED ENVIRONMENT

(71) Applicant: **Global Tel*Link Corporation**, Reston, VA (US)

(72) Inventor: Stephen L. Hodge, Aubry, TX (US)

(73) Assignee: **Global Tel*Link Corporation**, Reston, VA (US)

(*) Notice: Subject to any disclaimer, the term of this patent is extended or adjusted under 35 U.S.C. 154(b) by 20 days.

This patent is subject to a terminal disclaimer.

(21) Appl. No.: 16/513,330

(22) Filed: Jul. 16, 2019

(65) Prior Publication Data

US 2019/0340338 A1 Nov. 7, 2019

Related U.S. Application Data

(60) Continuation of application No. 16/273,881, filed on Feb. 12, 2019, now Pat. No. 10,592,643, which is a
(Continued)

(51) Int. Cl.
*H04L 29/06* (2006.01)
*G06F 21/12* (2013.01)
(Continued)

(52) U.S. Cl.
CPC ........ *H04W 12/0804* (2019.01); *G06F 16/22* (2019.01); *G06F 16/285* (2019.01);
(Continued)

(58) Field of Classification Search
CPC ......... H04L 41/28; H04L 63/10; H04L 41/50; H04L 41/08; H04L 63/20; H04L 41/22; H04L 41/12; H04W 12/0806; H04W 12/0804; G06F 21/6218; G06F 16/285; G06F 21/121; G06F 16/22
See application file for complete search history.

(56) References Cited

U.S. PATENT DOCUMENTS 4,495,386 A 1/1985 Brown et al.
5,255,306 A 10/1993 Melton et al.
(Continued)

OTHER PUBLICATIONS

"Criminal Calls: A Review of the Bureau of Prisons' Management of Inmate Telephone Privileges," U.S. Department of Justice, Office of the Inspector General, Aug. 1999.
(Continued)

*Primary Examiner* — Mohammad A Siddiqi
(74) *Attorney, Agent, or Firm* — Sterne, Kessler, Goldstein & Fox P.L.L.C.

(57) ABSTRACT

A wireless device enterprise management system and a method for operating the management system in a controlled environment is disclosed. The enterprise management system includes implementing a container-based file system on wireless devices within the controlled environment. Enterprise management system manages and controls the organization of files into one or more containers on each wireless device. Each container is associated with one or more execution rules that allow or restrict execution of files that are located in the container.

15 Claims, 13 Drawing Sheets

Related U.S. Application Data continuation of application No. 15/668,496, filed on Aug. 3, 2017, now Pat. No. 10,205,727, which is a division of application No. 15/581,962, filed on Apr. 28, 2017, now Pat. No. 9,892,242, said application No. 16/273,881 is a continuation of application No. 15/668,504, filed on Aug. 3, 2017, now Pat. No. 10,354,053, which is a division of application No. 15/581,962, filed on Apr. 28, 2017, now Pat. No. 9,892,242.

(51) Int. Cl.
| | | |
|---|---|---|
| *G06F 21/62* | (2013.01) | |
| *G06F 16/22* | (2019.01) | |
| *H04L 12/24* | (2006.01) | |
| *H04W 12/08* | (2021.01) | |
| *G06F 16/28* | (2019.01) | |

(52) U.S. Cl.
CPC ........ *G06F 21/121* (2013.01); *G06F 21/6218* (2013.01); *H04L 41/08* (2013.01); *H04L 41/28* (2013.01); *H04L 41/50* (2013.01); *H04L 63/10* (2013.01); *H04W 12/0806* (2019.01); *H04L 41/12* (2013.01); *H04L 41/22* (2013.01); *H04L 63/20* (2013.01)

(56) References Cited

U.S. PATENT DOCUMENTS

| | | | |
|---|---|---|---|
| 5,896,556 A | 4/1999 | Moreland et al. | |
| 6,054,928 A | 4/2000 | Lemelson et al. | |
| 6,058,173 A | 5/2000 | Penfield et al. | |
| 6,668,045 B1 | 12/2003 | Mow | |
| 6,965,590 B1 | 11/2005 | Schmidl et al. | |
| 7,085,359 B2 | 8/2006 | Crites et al. | |
| 7,106,843 B1 | 9/2006 | Gainsboro et al. | |
| 7,218,993 B2 | 5/2007 | Yasukawa et al. | |
| 7,254,708 B2 | 8/2007 | Silvester | |
| 7,280,816 B2 | 10/2007 | Fratti et al. | |
| 7,333,798 B2 | 2/2008 | Hodge | |
| 7,366,782 B2 | 4/2008 | Chong et al. | |
| 7,529,357 B1 | 5/2009 | Rae et al. | |
| 7,587,067 B1 | 9/2009 | Schiller | |
| 7,742,581 B2 | 6/2010 | Hodge et al. | |
| 7,804,941 B2 | 9/2010 | Keiser et al. | |
| 7,860,222 B1 | 12/2010 | Sidler et al. | |
| 7,899,167 B1 | 3/2011 | Rae | |
| 8,019,354 B2 | 9/2011 | Rae et al. | |
| 8,031,052 B2 | 10/2011 | Polozola | |
| 8,370,206 B2 | 2/2013 | Collins | |
| 8,428,559 B2 | 4/2013 | Silva | |
| 8,498,937 B1 | 7/2013 | Shipman, Jr. et al. | |
| 8,571,525 B2 | 10/2013 | Weinstein et al. | |
| 8,639,926 B2 | 1/2014 | Brown et al. | |
| 8,646,056 B2 | 2/2014 | Poplett | |
| 8,917,848 B2 | 12/2014 | Torgersrud et al. | |
| 9,094,500 B1 | 7/2015 | Edwards | |
| 9,124,763 B2 | 9/2015 | Humphries | |
| 9,137,262 B2* | 9/2015 | Qureshi | H04W 12/0806 |
| 9,232,051 B2 | 1/2016 | Torgersrud et al. | |
| 9,262,604 B2 | 2/2016 | Kimbrell | |
| 9,282,188 B2 | 3/2016 | Hodge et al. | |
| 9,307,386 B2 | 4/2016 | Hodge et al. | |
| 9,614,954 B2 | 4/2017 | Hodge et al. | |
| 9,614,955 B2 | 4/2017 | Hodge et al. | |
| 9,661,128 B2 | 5/2017 | Hodge et al. | |
| 9,674,338 B2 | 6/2017 | Hodge et al. | |
| 9,871,915 B2 | 1/2018 | Hodge et al. | |
| 9,888,108 B2 | 2/2018 | Hodge et al. | |
| 9,892,242 B1* | 2/2018 | Hodge | H04W 12/0806 |
| 10,205,727 B2 | 2/2019 | Hodge | |
| 10,326,637 B2* | 6/2019 | Dabbiere | G06F 21/54 |
| 10,354,053 B2 | 7/2019 | Hodge | |
| 10,592,643 B2* | 3/2020 | Hodge | H04L 41/08 |
| 2002/0071537 A1 | 6/2002 | Gainsboro | |
| 2003/0036381 A1 | 2/2003 | Nagashima | |
| 2003/0086546 A1 | 5/2003 | Falcone et al. | |
| 2003/0126470 A1 | 7/2003 | Crites et al. | |
| 2003/0198325 A1 | 10/2003 | Bayne | |
| 2003/0224764 A1 | 12/2003 | Baker | |
| 2005/0265529 A1 | 12/2005 | Hogg, Jr. et al. | |
| 2006/0062355 A1 | 3/2006 | Leonard | |
| 2006/0176169 A1 | 8/2006 | Doolin et al. | |
| 2007/0041545 A1 | 2/2007 | Gainsboro | |
| 2007/0047694 A1 | 3/2007 | Bouchard et al. | |
| 2007/0057763 A1 | 3/2007 | Blattner et al. | |
| 2008/0057976 A1 | 3/2008 | Rae et al. | |
| 2008/0200156 A1 | 8/2008 | Hicks et al. | |
| 2009/0080629 A1 | 3/2009 | Rokosky et al. | |
| 2010/0062833 A1 | 3/2010 | Mattice et al. | |
| 2010/0189228 A1 | 7/2010 | Seyfetdinov | |
| 2010/0260173 A1 | 10/2010 | Johnson | |
| 2011/0004878 A1 | 1/2011 | Divoux | |
| 2011/0158223 A1 | 6/2011 | Liu et al. | |
| 2011/0213618 A1 | 9/2011 | Hodge et al. | |
| 2011/0237226 A1 | 9/2011 | Dhuna | |
| 2012/0099714 A1 | 4/2012 | Hodge | |
| 2012/0252411 A1 | 10/2012 | Johnsgard et al. | |
| 2012/0262271 A1 | 10/2012 | Torgersrud et al. | |
| 2013/0179210 A1 | 7/2013 | Collins | |
| 2013/0311364 A1 | 11/2013 | Shipman et al. | |
| 2014/0032691 A1 | 1/2014 | Barton et al. | |
| 2014/0044242 A1 | 2/2014 | Hodge et al. | |
| 2014/0089849 A1 | 3/2014 | Choi et al. | |
| 2014/0108649 A1 | 4/2014 | Barton | |
| 2014/0109174 A1* | 4/2014 | Barton | H04W 12/0027 726/1 |
| 2014/0219432 A1 | 8/2014 | Bengston et al. | |
| 2014/0267547 A1 | 9/2014 | Torgersrud et al. | |
| 2014/0273929 A1 | 9/2014 | Torgersrud | |
| 2014/0282868 A1 | 9/2014 | Sheller et al. | |
| 2014/0287715 A1 | 9/2014 | Hodge et al. | |
| 2015/0242629 A1 | 8/2015 | Undo et al. | |
| 2016/0055323 A1 | 2/2016 | Stuntebeck et al. | |
| 2016/0066182 A1 | 3/2016 | Hodge et al. | |
| 2016/0088021 A1 | 3/2016 | Jayanti Venkata et al. | |
| 2016/0219146 A1 | 7/2016 | Hodge et al. | |
| 2016/0267257 A1 | 9/2016 | Wisgo | |
| 2016/0330084 A1 | 11/2016 | Hunter et al. | |
| 2016/0381212 A1 | 12/2016 | Hodge et al. | |
| 2016/0381219 A1 | 12/2016 | Hodge et al. | |
| 2016/0381556 A1 | 12/2016 | Hodge et al. | |
| 2017/0061006 A1 | 3/2017 | Hildebrand et al. | |
| 2017/0084150 A1 | 3/2017 | Keyton | |
| 2017/0177892 A1* | 6/2017 | Tingstrom | G06F 16/22 |
| 2017/0193622 A1 | 7/2017 | Rosado | |
| 2017/0208468 A1 | 7/2017 | Hodge et al. | |
| 2018/0316675 A1 | 11/2018 | Hodge | |
| 2019/0171754 A1 | 6/2019 | Hodge | |
| 2019/0182255 A1 | 6/2019 | Hodge | |

OTHER PUBLICATIONS

European Search Report and Opinion directed to European Patent Application No. 14769931.8, dated Oct. 26, 2016; 10 pages.

International Search Report and Written Opinion of the International Searching Authority, directed to related International Patent Application No. PCT/US14/31339, dated Nov. 6, 2014; 19 pages.

Knox, "The Problem of Gangs and Security Threat Groups (STG's) in American Prisons Today: Recent Research Findings From the 2004 Prison Gang Survey," National Gang Crime Research Center, 2005; 67 pages.

Rey, R.F., ed., "Engineering and Operations in the Bell System," 2nd Edition, AT&T Bell Laboratories: Murray Hill, NJ, 1983.

Rosenberg, et al., "SIP: Session Initial Protocol," Network Working Group, Standard Track, Jun. 2002; 269 pages.

U.S. Appl. No. 61/801,861, "Handheld Video Visitation," to Torgersrud, et al., filed Mar. 15, 2013.

Winterdyk et al., "Managing Prison Gangs," Journal of Criminal Justice, vol. 38, 2010; pp. 730-736.

(56) References Cited

OTHER PUBLICATIONS

U.S. Appl. No. 61/804,479, filed Mar. 22, 2013.
File History of U.S. Pat. No. 9,094,500, U.S. Appl. No. 14/322,869, filed Jul. 2, 2014.
File History of U.S. Pat. No. 9,307,386, U.S. Appl. No. 13/946,637, filed Jul. 19, 2013.

* cited by examiner

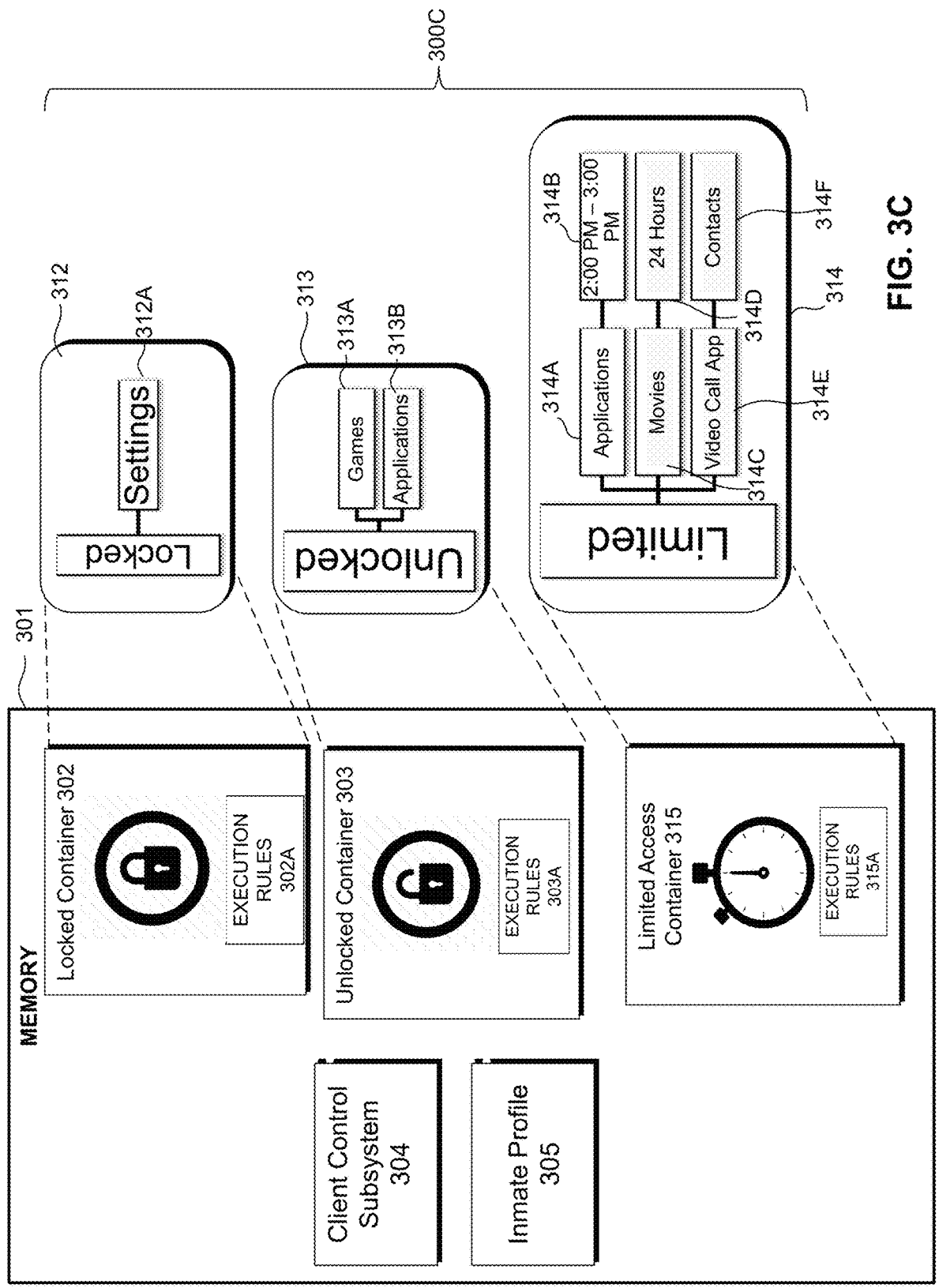

US 10,966,090 B2

UNIFIED ENTERPRISE MANAGEMENT OF WIRELESS DEVICES IN A CONTROLLED ENVIRONMENT

CROSS REFERENCE TO RELATED APPLICATIONS

This application is a continuation of U.S. Nonprovisional patent application Ser. No. 16/273,881, filed Feb. 12, 2019, which is a continuation of U.S. Pat. No. 10,205,727, filed Aug. 3, 2017 and U.S. Pat. No. 10,354,053, filed Aug. 3, 2017, both of which are a division of U.S. Pat. No. 9,892, 242, filed Apr. 28, 2017, and all of which are entitled "Unified Enterprise Management of Wireless Devices in a Controlled Environment," the contents of all are hereby incorporated herein by reference in their entirety.

BACKGROUND

Field

This disclosure relates to a unified enterprise management system for managing and securing wireless devices within a controlled environment.

Background

Use of wireless devices within a controlled environment, such as a correctional facility or prison, has become increasingly prevalent. Within a controlled environment, wireless devices are used by its tenants but are controlled by the controlled environment. Therefore, wireless devices within the controlled environment include files owned by the tenants and files owned by the controlled environment. Moreover, wireless devices in the controlled environment are expanding to include wireless devices provided by the controlled environment as well as devices brought into the controlled environment by its tenants.

Accordingly, wireless devices in a controlled environment are becoming increasingly difficult to manage. The proliferation of both the number and types of wireless devices and the fractured ownership of files on the wireless devices stress the controlled environment's ability to control and track usage of all wireless devices and executed files within its walls. Prior art methods are currently not equipped to efficiently manage these devices and files which increases the possibility that the wireless devices can be compromised and improperly used.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

FIGS. 3A-3C illustrate an exemplary implementations of a container-based security system on a wireless device for use in the exemplary wireless device enterprise management system of FIG. 1, according to embodiments of the present disclosure.

Figure 1:
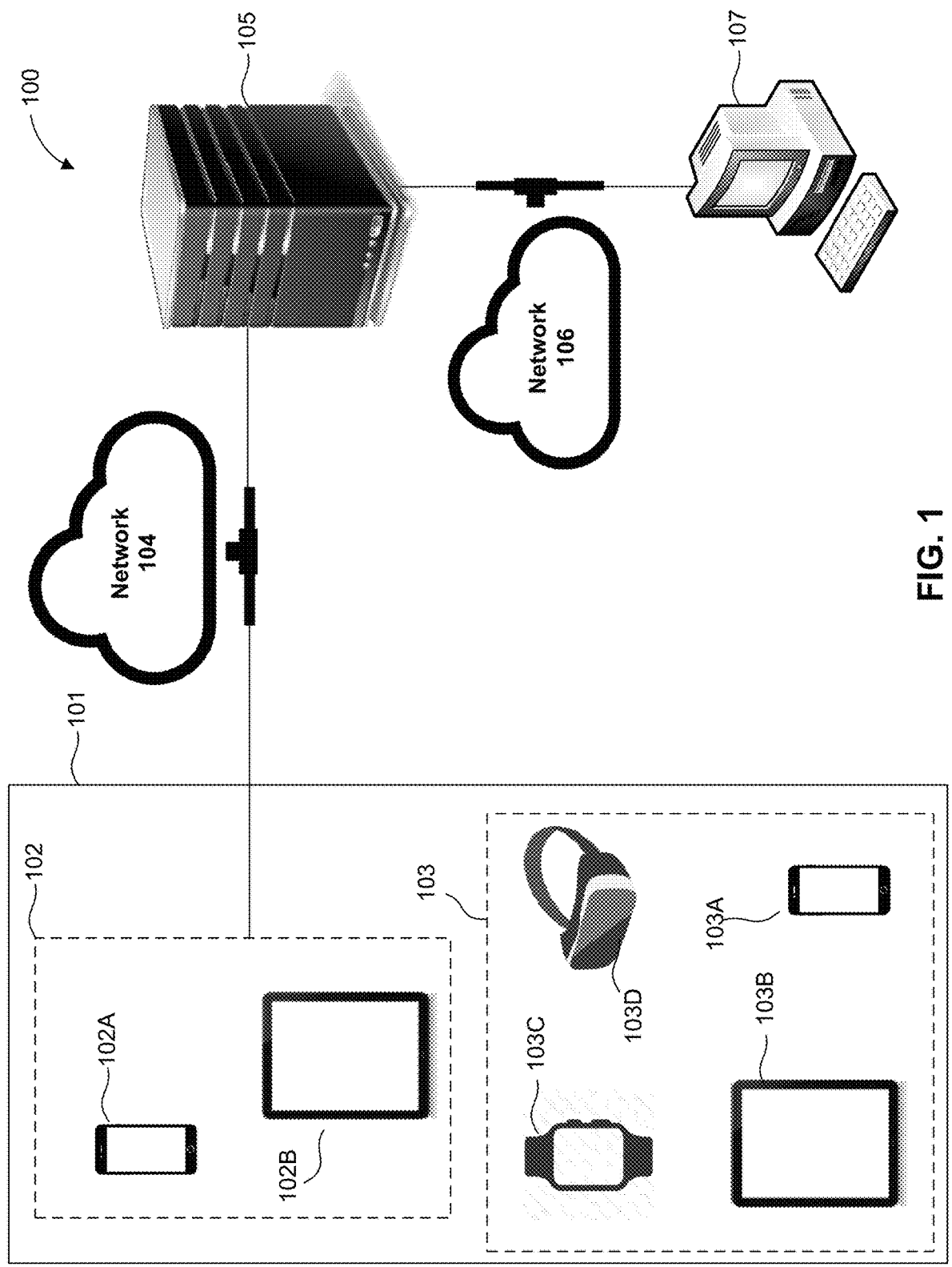
FIG. 1 illustrates a block diagram of an exemplary wireless device enterprise management system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Wireless Device Enterprise Management System

FIG. 1 illustrates a block diagram of an exemplary wireless device enterprise management system 100, according to embodiments of the present disclosure. Wireless device enterprise management system 100 may be implemented in a controlled environment, such as a prison. Wireless device enterprise management system 100 provides unified management of the heterogeneous wireless devices, such as prison-issued wireless devices and bring-your-own (BYO) wireless devices that are owned and brought by inmates and/or guards into the prison, that may be deployed within a controlled environment.

In some embodiments, wireless device enterprise management system 100 includes controlled environment 101 which can include one or more BYO wireless device 102, one or more prison-issued wireless device 103, a managed mobile device management system (MMDM) 105, and a workstation 107. In some embodiments, BYO wireless device 102 can include a smartphone 102A and a tablet 102B. In some embodiments, prison-issued wireless device 103 can include a smartphone 103A, tablet 103B, wearable device 103C, and a virtual reality device 103D. Other variations, such as a different number or different types of wireless devices, are within the scope of the invention.

BYO wireless device 102 is wireless device that is owned and brought into controlled environment 101 by inmates and/or guards. Prison-issued wireless device 103 is a wireless device owned by and provided by controlled environment 101 to the inmate and/or guard. In some embodiments, controlled environment 101 can include both one or more BYO wireless devices 102 and one or more prison-issued wireless devices 103. In some embodiments, controlled environment 101 includes one or more BYO wireless device 102 or one or more prison-issued wireless device 103. As will be discussed in further detail below, a client control subsystem is installed in each wireless device of controlled environment 101. In some embodiments, each wireless device can only utilize network features provided by controlled environment 101 when the client control subsystem is installed.

In some embodiments, wireless device enterprise management system 100 further includes a network 104 that connects BYO wireless device 102 and prison-issued wireless device 103 to MMDM 105. In some embodiments, MMDM 105 is co-located with controlled environment 101 such as a prison. In some embodiments, MMDM 105 may be located remotely from controlled environment 101. Network 104 may include any or all of a Local-Area Network (LAN), a Wide-Area Network (WAN), or the Internet, depending on the location of MMDM 105 in relation to controlled environment 101. For example, network 109 is implemented as a LAN when MMDM 105 is co-located with controlled environment 101. In another example, network 104 is implemented as a WAN or the Internet when MMDM 105 is located at remotely from controlled environment 101. In some embodiments, MMDM 105 is cloud-based and includes one or more cloud-based servers. In some embodiments, MMDM 105 is a server within a data center that supports the wireless devices within controlled environment 101.

In some embodiments, wireless device enterprise management system 100 also includes network 106 and workstation 107. Although only one workstation is depicted in FIG. 1 for simplicity, any number of workstations are within the scope of the disclosure. Network 112 may include any or all of a Local-Area Network (LAN), a Wide-Area Network (WAN), or the Internet, depending on the location of workstation 107 in relation to MMDM 105. For example, network 106 can be implemented as a LAN when workstation 107 is co-located with MMDM 105. In another example, network 106 is implemented as a WAN or the Internet when workstation 107 is located remotely from MMDM 105. Workstation 107 provides authorized personnel access to enterprise management features of MMDM 105 which are discussed in additional detail herein.

In some embodiments, BYO wireless device 102 and prison-issued wireless device 103 can connect to network 104 through wired connections, such as using a USB or Ethernet cable. In some embodiments, BYO wireless device 102 and prison-issued wireless device 103 can connect to network 104 through wireless connections, such as Bluetooth or IEEE 802.11 (commonly known as Wi-Fi). BYO wireless device 102 and prison-issued wireless device 103 can connect to network 104 through one or more access points (not shown) that are installed in specific areas of controlled environment 101 and can provide network access between BYO wireless device 102 and prison-issued wireless device 103. The access point can be implemented as any device that provides network access such as, but not limited to, a router, a modem, smartphone, a tablet, or a laptop device.

In some embodiments, MMDM 105 approves all communications to and from wireless devices in controlled environment 101. All communications from wireless devices, such as BYO wireless device 102 and prison-issued wireless device 103 are routed to MMDM 105. MMDM 105 has access to and controls the file systems of all wireless devices within controlled environment 101 including BYO wireless device 102 and prison-issued wireless device 103. In particular, MMDM 105 can be responsible for analyzing the file system of a wireless device, such as BYO wireless device 102 or prison-issued wireless device 103, and organizing the files of the file system into different containers based on execution rules established by authorized personnel of controlled environment 101 and/or by MMDM 105. Execution rules can be downloaded to BYO wireless device 102 and prison-issued wireless device 103 at any time when such devices are connected to a network of controlled environment 101. In this manner, authorized personnel control the execution of files on all wireless devices in controlled environment 101. Containers are discussed in further detail with respect to FIG. 2.

Execution rules are responsible for the creation of containers on wireless devices within controlled environment 101. Execution rules specify conditions for execution to be applied to a group of files located on a file system of a wireless device, such as BYO wireless device 102 and prison-issued wireless device. For example, an execution rule may specify that certain applications, such as certain video conferencing applications or browsing application, are banned from execution within controlled environment. A container is created based on this execution rule and all files identified by the execution rule are placed within the container. A container is a representation of a file system on wireless device that includes certain files that are specifically associated with the container. Accordingly, execution of files that are associated with the container are conditioned on the execution rules. For example, the banned video conferencing applications or browsing applications are stored within the container and any attempts to execute files associated with the banned applications are first compared with the execution rule of the container. If the execution rule indicates that the container contains banned files, execution of the files is prevented.

Execution rules can be applied to a particular wireless device, to multiple wireless devices, or to different types of wireless devices. For example, execution rules can be applied to a specific wireless device such as BYO wireless device 102 which includes content that may not have been approved or authorized by controlled environment. In such a circumstance, execution rules allow controlled environment 101 to control the execution of unauthorized files while maintaining them on the BYO wireless device 102. An execution rule can place the unauthorized files within a container that restricts access. When the inmate is released, the container can be removed and control of the unauthorized files can be returned to the now-free inmate. Accordingly, there may be different execution rules for each BYO wireless device because each BYO wireless device may have different unauthorized files that require analysis by MMDM 105. This feature is further discussed with regard to FIG. 8.

Execution rules can also be applied to different types of wireless devices. For example, execution rules can be created that apply only to smartphones, such as smartphone 102A or smartphone 103A, tablets such as tablet 102B or tablet 103B, wearable devices such as wearable device 103C, and virtual reality devices such as virtual reality device 103D. For example, an execution rule for smartphone 102A can be created that places files associated with GSM or LTE settings in a locked container which restricts the user's ability to access those settings. Because smartphone 102A is a BYO wireless device, such an execution rule is necessary to prevent the user from access settings to which he normally has access. Additionally, the container encapsulating the GSM or LTE settings can be removed and control of the settings can be returned to the inmate when released from controlled environment 101.

Moreover, MMDM 105 is responsible for scheduling, transmitting, and managing over-the-air wireless updates to wireless devices. As will be discussed in additional detail below, MMDM 105 communicates with a client control subsystem installed in each wireless device in order to coordinate management and control of each wireless device in controlled environment 101.

In some embodiments, workstation 107 provides administrative access to management features of MMDM 105. Workstation 107 communicates with MMDM 105 and allows authorized personnel to manage and control container settings for each device within controlled environment 101. MMDM 105 can provide an administrative graphical user interface (GUI) that enables personnel to view and manage files within each device based on container rules and inmate profiles associated with the wireless device.

Exemplary Wireless Device

Figure 2:
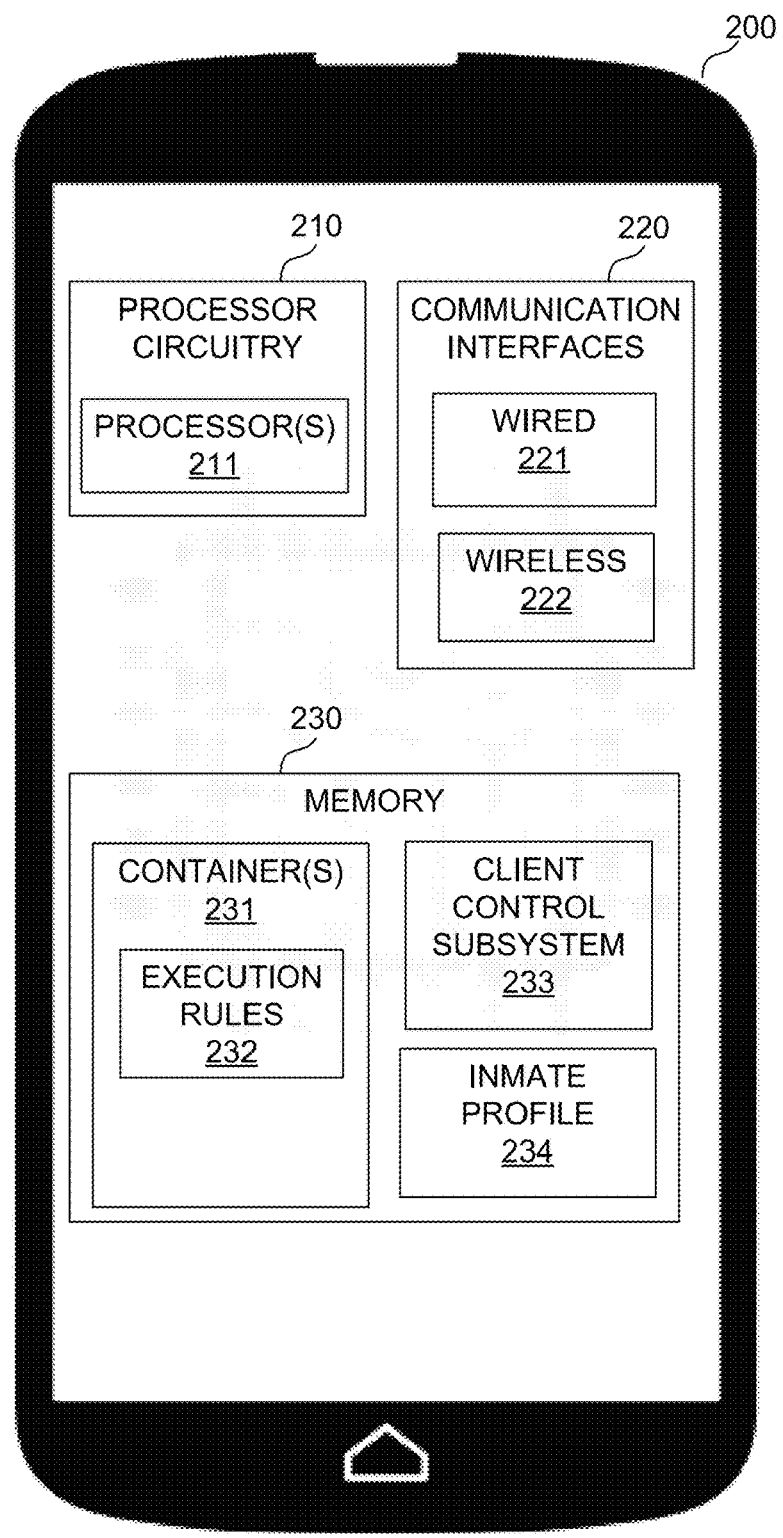
FIG. 2 illustrates a block diagram of an exemplary wireless device for use in the exemplary wireless device enterprise management system of FIG. 1, according to embodiments of the present disclosure.

FIG. 2 illustrates a block diagram of an exemplary wireless device 200 for use in the exemplary wireless device enterprise management system of FIG. 1, according to embodiments of the present disclosure. Wireless device 200 represents an exemplary embodiment of BYO wireless device 102 and prison-issued wireless device 103 as described in FIG. 1. In some embodiments, wireless device 200 includes processor circuitry 210, communication interfaces 220 and memory 230.

Processor circuitry 210 includes one or more processors 211. The number of processors 211 can be scaled to match the number of simultaneous user connections desired to be supported by an wireless device enterprise management system such as wireless device enterprise management system 100 of FIG. 1. Processors 211 of processor circuitry 210 control the operation of wireless device 200 and its components including communication interfaces 220 and memory 230.

Communication interfaces 220 include one or more transceivers, transmitters, and/or receivers that communicate via a wireless interface 222, such as through one or more antennas, or a wired interface 221, such as through a USB cable. For example, communication interfaces 220 includes a component, such as a Bluetooth transceiver, that enables Bluetooth communication between wireless device 200 and an external device that also has Bluetooth capability, such as a smartphone, a tablet, a wireless headset, and/or wireless earbuds. In an embodiment, communication interfaces 220 are configured to transmit and receive communications between wireless device 200 and MMDM 105 via network 104. In an embodiment, communication interfaces 220 connect wireless device 200 with other devices such as a mobile device, a kiosk, an access point, a beacon, and/or external input devices such as a keyboard, mouse, camera, or touch interface.

In some embodiments, memory 230 includes at least one container 231, a client control subsystem 233, and inmate profile 234. Although only one container 231 is depicted in FIG. 2, memory 230 can contain additional containers as necessary to encapsulate the file system of wireless device 200. Container 231 is a virtual encapsulation of one or more files of the file system of wireless device 200 and conditions access to the encapsulated one or more files based on execution rules 232. Execution rules 232 control a user's ability execute files on wireless device 200. Examples of execution rules 232 include but are not limited to restricted execution of files, allowed execution of files, and limited execution of files. Execution rules 232 determine the type of container and the files contained therein. For example, execution rules 232 that restrict a user's ability to access or execute files are any data stored on wireless device 200 and include but are not games, applications, settings, and personal information such as contacts. Wireless device 200 may contain any number of containers each having different execution rules.

Based on execution rules 232, client control subsystem 233 controls the creation and management of container 231, controls access to container 231, and coordinates security of wireless device 200 by communicating with MMDM 105. In some embodiments, execution rules 232 are provided by MMDM 105. Client control subsystem creates containers and assigns files to the created containers based on execution rules 232.

Client control subsystem 233 enforce execution rules 232 associated with container 231. In some embodiments, client control subsystem 233 is required to be loaded onto any wireless device in order to connect with a network of controlled environment 101. In some embodiments, client control subsystem 233 maintains a connection over network 104 with MMDM 105. MMDM 105 can utilize the connection to manage wireless device 200 through client control subsystem 233.

In some embodiments, inmate profile 234 includes information regarding the user of wireless device 200 such as content associated with the user (e.g., purchased by the inmate through a network of controlled environment 101 or that was already stored on wireless device 200) and access privileges to content (e.g., the games or applications that the inmate may or may not access). Whereas execution rules 232 control how and when a user may access and execute content stored in memory 230, inmate profile 234 controls the content from an external source from which a user can download or access content while utilizing wireless device 200. In some embodiments, client control subsystem 233 coordinates the creation of container 231 on wireless device 200 based on execution rules 232 and inmate profile 234. As a non-limiting example, inmate profile 234 can specify that the inmate of wireless device 200 may purchase games or applications through a network of controlled environment 101. Execution rules 232 can specify that the inmate may not access games between 10:00 PM and 9:00 AM. Accordingly, client control subsystem 233 may organize all games on wireless device into a limited access container that prevents the user from executing the files (i.e., accessing the games) during the specified period of execution rules 232. In some embodiments, inmate profile 234 may include execution rules 232 or vice versa.

Figure 3A:
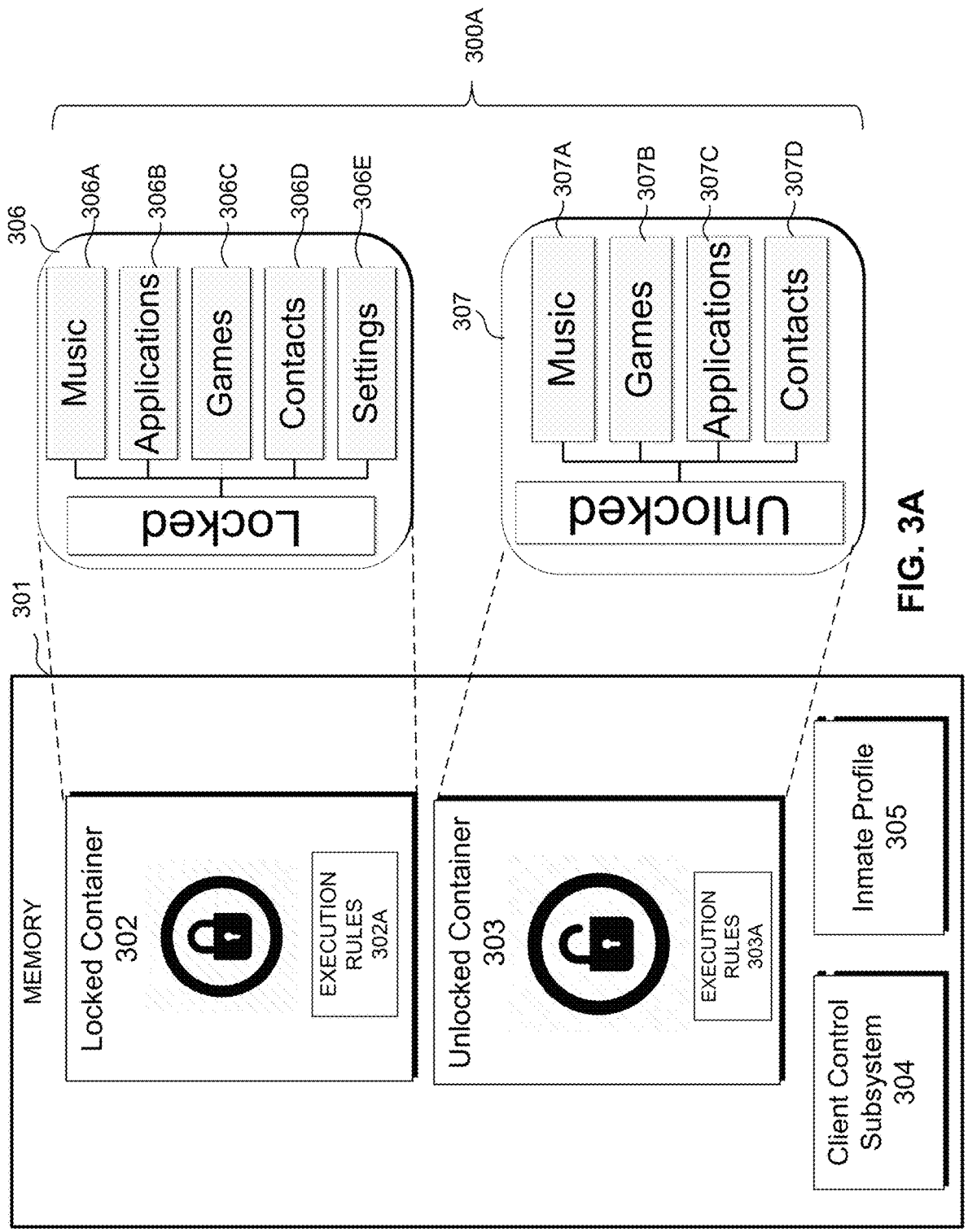
Figure 3B:
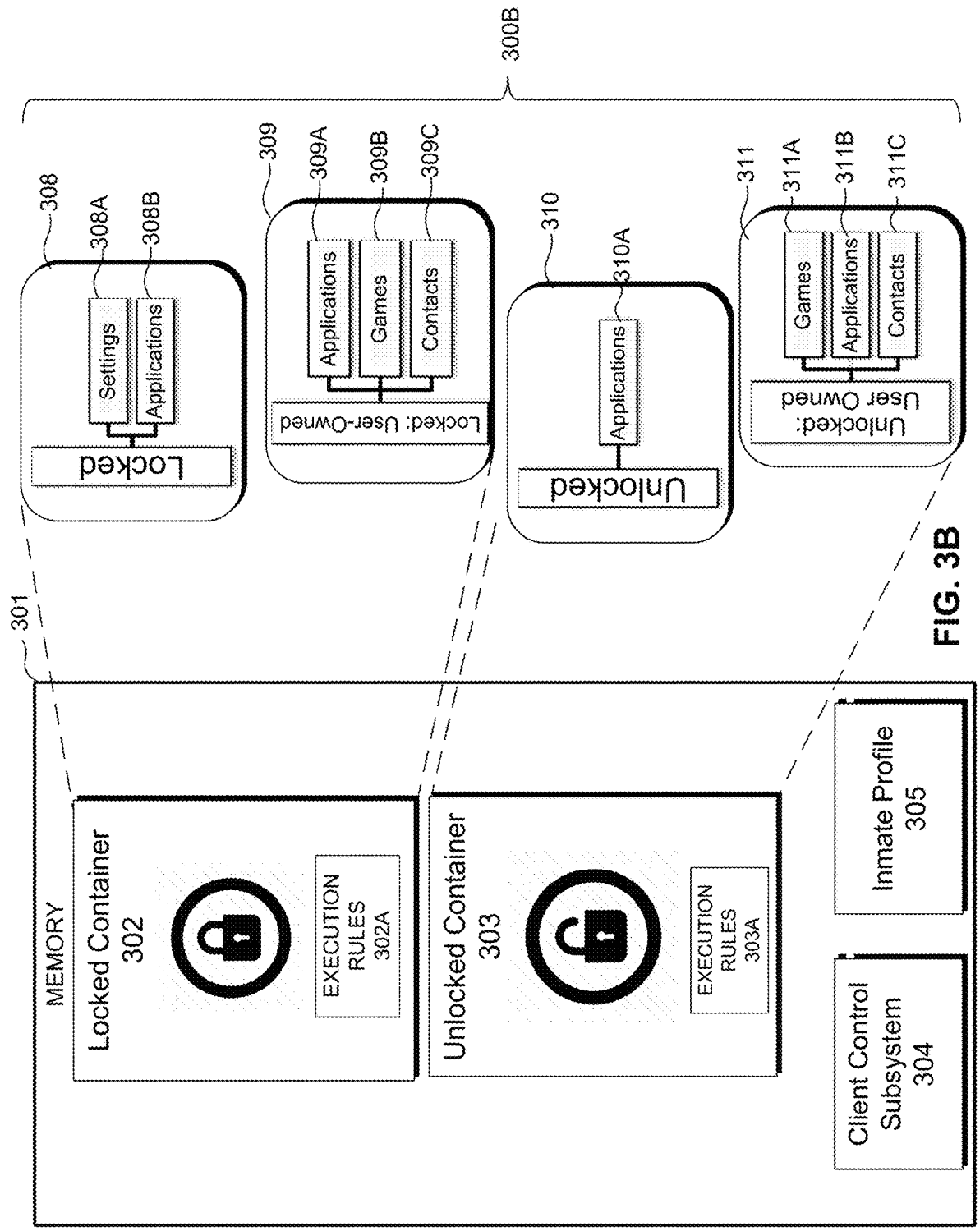

FIGS. 3A-3C illustrate an exemplary implementations of memory 301 for use in the exemplary wireless device 200 of FIG. 2, according to embodiments of the present disclosure. In some embodiments, memory 301 represents an exemplary embodiment of memory 230 as depicted in FIG. 2.

With regard to FIG. 3A, in some embodiments, memory 301 includes locked container 302, unlocked container 303, client control subsystem 304, and inmate profile 305. In some embodiments, memory 301 organizes files into file system 300A which is further organized into separate file systems contained within locked container 302 and unlocked container 303. Locked container 302 can organize its files into a locked file system 306 while unlocked container 303 organizes its files into unlocked file system 307. It should be understood that container-based file system 300A is merely representative of files that can be organized within memory 301. Other methods of organization of files are possible as long as they are encapsulated within a container as further described herein.

As described above, properties of containers are defined by execution rules which govern the type of access to the files stored in the containers. For example, locked container 302 is a restricted container based on execution rules 302A which limit a user's ability to access and execute files organized within locked container 302. Locked container 302 includes locked file system 306 which stores files such as locked music files 306A, locked applications 306B, locked games 306C, locked contacts 306D, and locked settings 306E. In some embodiments, locked file system 306 can contain files that are restricted from execution by a user of wireless device 200. Locked file system 306 can be utilized to restrict access to files such as files that are banned for use within controlled environment or files that are banned for use by a specific inmate (e.g., as determined from inmate profile 305).

The ability to access and/or execute file system 306 are controlled by execution rules 302A. For example, execution rules 302A may prevent a user from accessing any files stored in file system 306 under any condition such as settings 306E of the device including wireless network information and disabling other communications capabilities of wireless device 200 such as global system for mobile communication (GSM) or long-term evolution (LTE). Similarly, controlled environment may allow wireless devices to utilize other communications capabilities such as Bluetooth. Accordingly, Bluetooth settings may be stored in unlocked container 303.

In some embodiments, unlocked container 303 allows a user unrestricted access to files stored in unlocked file system 307. In other words, unlocked file system 307 allows a user of wireless device 200 to execute and otherwise utilize the files stored therein. Execution rules 302A define the levels of access for file system 307. Files can include unlocked music 307A, unlocked games 307B, unlocked applications 307C, and unlocked contacts 307D. The ability to access and/or execute unlocked file system 307 are controlled by execution rules 303A. For example, execution rules 303A may indicate that a user can access and execute any files stored in unlocked file system 307.

With regard to FIG. 3B, in some embodiments, memory 301 includes locked container 302, unlocked container 303, client control subsystem 304, and inmate profile 305. In some embodiments, memory 301 organizes files into file system 300B which is further organized into separate file systems contained within locked container 302 and unlocked container 303. For example, locked container 302 can further organize its files into separate file systems such as locked file system 308 and locked user-owned file system 309. Similarly, unlocked container 303 can further organize its files into unlocked file system 310 and unlocked user owned file system 311. File systems generated in each container can be established and controlled by separate execution rules associated with the container as well as an inmate profile associated with the user of wireless device 200. It should be understood that file system 300B is merely representative of files that can be organized within memory 301. Other methods of organization of files are possible as long as they are encapsulated within a container as further described herein.

Containers may utilize different file systems to differentiate between different types of files. For example, based on execution rules 302A and inmate profile 305, locked container 302 can have two separate file systems for locked files—locked file system 308 for restricted files that are owned or controlled by controlled environment 101 and locked user—owned file system 309 for restricted files that were purchased or owned by the user of wireless device 200. In some embodiments, locked file system 308 can contain files, such as settings 308A and applications 308B, that are owned and/or controlled by controlled environment 101. Settings 308A can include any settings of wireless device 200 to which controlled environment 101 restricts access by a user of wireless device 200. Applications 308B can include any programs or applications that are loaded or stored on wireless device by controlled environment 101 and to which controlled environment 101 restricts access such as a client control application or a program that allows controlled environment 101 to remotely access and control wireless device 200. Locked user-owned file system 309 can contain files, such as applications 309A, games 309B, and contacts 309C, that are owned by the user of wireless device 200 but that are also restricted from access. For example, when wireless device 200 is a BYO wireless device such as BYO wireless device 102, applications 309A can include any application owned by the user either prior to his incarceration or purchased by the user while incarcerated (e.g., from controlled environment 101) and to which controlled environment 101 restricts access. Examples of applications 309A can include video conferencing applications, browser applications, networking applications, and games. In such instances, controlled environment 101 would restrict the user's access to applications 309A while the user remains incarcerated in controlled environment 101. When the user is released from controlled environment 101, controlled environment can remove containers and the file systems from wireless device and restores the user's access to his files.

Based on execution rules 303A and inmate profile 305, unlocked container 303 can have also have two separate file systems for unlocked files—unlocked file system 310 for unrestricted files that are owned or controlled by controlled environment 101 and unlocked user-owned file system 311 for unrestricted files that were purchased or owned by the user of wireless device 200. In some embodiments, unlocked file system 310 can contain files, such as applications 310A, that are owned and/or controlled by controlled environment 101. Applications 310A can include any programs or applications that are loaded or stored on wireless device by controlled environment 101 and to which controlled environment 101 allows user to access such as an approved video conferencing application and an approved Internet browser. Unlocked user-owned file system 311 can contain files, such as games 311A, applications 311B, and contacts 311C, that are owned by the user of wireless device 200 and can also be accessed while incarcerated in controlled environment 101. For example, when wireless device 200 is a BYO wireless device, applications 311B can include any application owned by the user prior to his incarceration or purchased by the user while incarcerated (e.g., from controlled environment 101) and to which controlled environment 101 allows access. Examples of applications 311B can include certain games or word processing applications. In such instances, controlled environment 101 would allow the user's access to applications 309A while the user remains incarcerated in controlled environment 101. As another example, contacts 311C may include contacts of people to which the user may still contact while incarcerated.

With regard to FIG. 3C, in some embodiments, memory 301 includes locked container 302, unlocked container 303, client control subsystem 304, inmate profile 305, and limited access container 315. In some embodiments, memory 301 organizes files into file system 300C which is further organized into separate file systems contained within locked container 302, unlocked container 303, and limited access container 315. For example, each container can organize its files into separate file systems such as locked file system 312 in locked container 302, unlocked file system 313 in unlocked container 303, and limited file system 314 in limited access container 315. File systems generated in each container can be established and controlled by separate execution rules associated with the container as well as an inmate profile associated with the user of wireless device 200. It should be understood that file system 300C is merely representative of files that can be organized within memory 301. Other methods of organization of files are possible as long as they are encapsulated within a container as further described herein.

Properties of containers are defined by execution rules which govern the type of access to the files stored in the containers and wireless device 200 may have any number of containers based on the execution rules. For example, based on execution rules 302A and inmate profile 305, locked container 302 can have locked file system 312 with locked files such as settings 312A, unlocked file system 313 with unlocked files such as games 313A and applications 313B. As discussed above, in some embodiments, locked file system 312 can contain files that are restricted from execution by a user of wireless device 200 and unlocked file system 313 can contain files that can be executed by a user of wireless device 200.

In some embodiments, other types of execution rules are within the scope of the invention and can allow for conditional execution of files. Such files can be placed in limited access container 315 and executed based on conditions established by execution rules 315A. Limited access container includes limited file system 314. Execution rules also specify conditions which are restrictions placed on the execution of files and can include but are not limited to time-based restrictions and usage-based restrictions. Time-based restrictions can refer to a certain period of day or a certain length of time. For example, limited file system 314 can include applications 314A and movies 314C having execution conditions 314B and 314D. Execution condition 314B specifies that applications 314A can only be executed by the user between 2:00 PM and 3:00 PM. Execution condition 314D can specify that user has 24 hours to watch movies 314C.

Usage-based restrictions can specify conditions for how a file can be executed by the user of wireless device 200. For example, limited file system can include a video calling application 314E and execution condition 314F. Execution condition 314F specifies that video calling application 314E can only be executed when the user attempts to contact a person listed in contacts 314F.

Organizing files into containers, such as locked container 302, unlocked container 303, and limited access container 315, allows administrators at controlled environment 101 and/or MMDM 105 to efficiently secure wireless devices within controlled environment 101. Container-based filed systems further enable a flexible unified approach to accommodating heterogeneous devices, such as BYO wireless devices and prison-issue wireless devices, within controlled environment 101.

Exemplary MMDM

Figure 4:
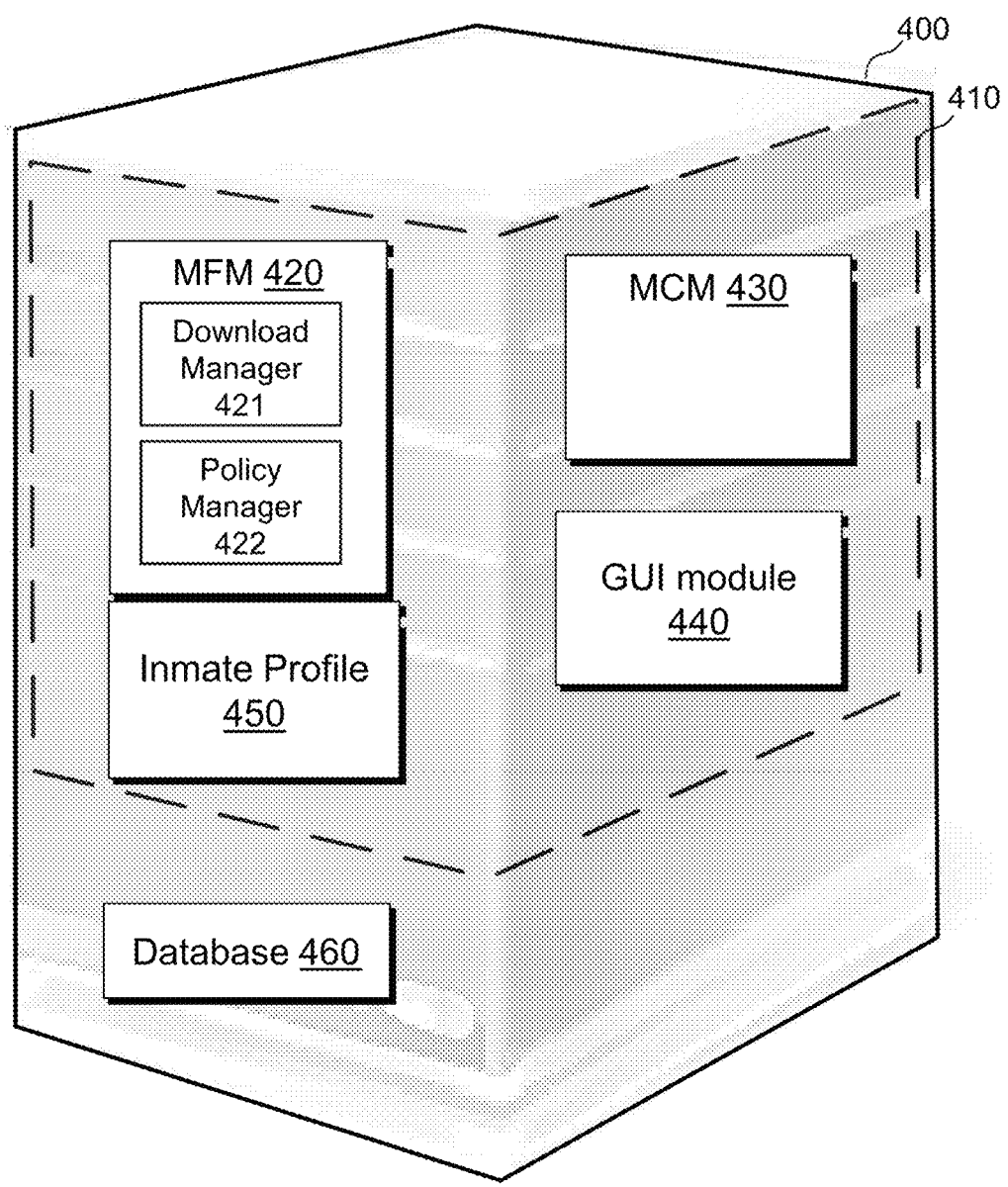
FIG. 4 illustrates an exemplary managed mobile device management system for use in the exemplary wireless device enterprise management system of FIG. 1, according to embodiments of the present disclosure.

FIG. 4 illustrates an exemplary managed mobile device management system (MMDM) 400 for use in the exemplary wireless device enterprise management system of FIG. 1, according to embodiments of the present disclosure. In some embodiments, MMDM 400 represents an exemplary embodiment of MMDM 105 of FIG. 1. MMDM 400 includes but is not limited to processing subsystem 410 and database 460. Processing subsystem 410 includes one or more processors, computers, or servers identified as subsystems and can be constructed as individual physical hardware devices, or as virtual devices, such as a virtual server. The number of processing subsystems can be scaled to match the number of simultaneous user connections desired to be supported by an inmate tracking system such as wireless device enterprise management system 100 of FIG. 1. Processors of processing subsystem 410 control the operation of mobile file manager (MFM) 420, mobile communications manager (MCM) 430, GUI module 440, and inmate profile 450.

In some embodiments, MFM 420 and MCM 430 establish execution rules associated with each container within a wireless device and coordinate with the client control subsystem in each wireless device to insure enforcement of the execution rules. MFM 420 monitors execution of files including all data, including background data, transmitted by each file on the wireless device over a network, such as network 104. As described above, in some embodiments, wireless devices, such as BYO wireless device 102 and prison-issued wireless device 103, in controlled environment 101 are required to connect to the wireless infrastructure provided by controlled environment. Accordingly, all data transmitted by wireless devices can be monitored by MMDM 105 to ensure compliance with execution rules associated with each wireless device.

In some embodiments, MFM 420 includes download manager 421 and policy manager 422. Download manager 421 controls the download of software and updates to wireless devices. For example, download manager 421 pushes over-the-air wireless updates to wireless devices. Policy manager 422 stores execution rules associated with containers in each wireless device and verifies that data and/or actions taken by files executed on wireless device comply with associated execution rules. MFM 420 coordinates monitoring of data with MCM 430 which receives data from executed files on wireless devices and verifies that the data from executed files comply with execution rules of the container in which the files are stored within the wireless devices. In some embodiments, a client control module on the wireless device may tag data transmitted from executed files (e.g., an application) to indicate the execution rules and/or containers in which the files are located. Policy manager 422 may examine the tag, retrieve the execution rules indicated by the tag, and either allow or deny further transmission of the data based on the execution rules. In some embodiments, the client control module may wrap the data transmitted by an executed file and encrypt the data with an encryption code. Policy manager 422 receives the wrapped data, examines the execution rules associated with the data, and either can deny transmitting the encrypted data or decrypt the data and allow transmission. In some embodiments, a client control module will enforce the execution rules and prevent or allow any transmission of data and policy manager 422 is responsible for logging the action taken by the client control module in database 460.

GUI module 440 provides an interface to administrators through connected stations, such as workstation 107 through network 106. The interface allows administrators to select wireless devices, control files stored on wireless devices, view file systems in each container for selected wireless devices, and generate execution rules for containers for selected wireless devices. The interface is discussed in further detail in FIG. 5.

Inmate profile 450 stores information associated with each inmate including files associated with the inmate. For example, inmate profile 450 can identify files such as applications and games associated with the inmate. This may include files purchased by the inmate and files provided to the inmate by controlled environment 101. Inmate profile 450 can also include administrative restrictions placed on the inmate. For example, administrators may want to limit the inmate's access to certain files or provide a schedule for when the inmate may access files. Information in inmate profile 450 can be utilized to generate execution rules that generate the appropriate containers for the wireless device used by the inmate.

As a non-limiting example, inmate profile 450 can specify that an inmate owns a game and a video conference application. Inmate profile 450 can also include an administrative restriction specifying an inmate is not allowed access to any video conference application (e.g., because the inmate has lost his calling privileges) and an administrative restriction specifying that the game can only be access during the day. Execution rules can be generated based on the identified files and the administrative restrictions. MMDM 400 can then transmit the generated execution rules to the wireless device of the inmate.

Database 460 includes any number of databases and/or servers, and stores and organizes data in a relational database. Database 460 runs a database management system, such as MYSQL™, to provide an example. Database 460 also includes organized data such that respective identity data, authentication data, jurisdictional requirements and rules, and settings that are indexed and linked to allow access to video data for each of the parties. Database 460 can store inmate profiles, execution rules, settings, files that can be downloaded by wireless devices, and a log for tracking actions performed by MMDM 400 associated with wireless device enterprise management system 100.

Figure 5:
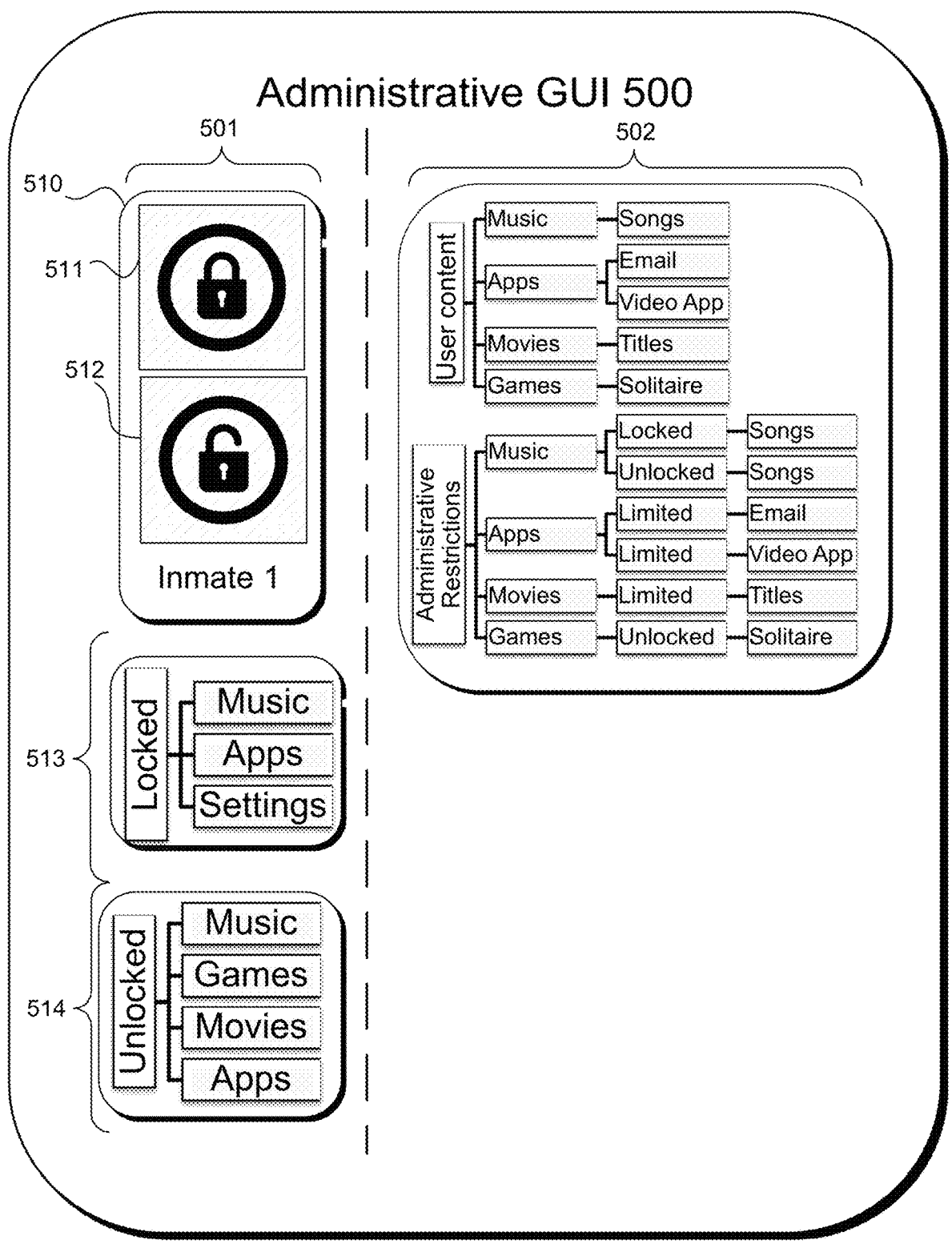
FIG. 5 illustrates an exemplary administrative graphical user interface for managing containers use in the exemplary wireless device enterprise management system of FIG. 1, according to embodiments of the present disclosure.

FIG. 5 illustrates an exemplary administrative graphical user interface (GUI) 500 for managing containers within a wireless device in the exemplary wireless device enterprise management system of FIG. 1, according to embodiments of the present disclosure. In some embodiments, GUI 500 is provided on a workstation, such as workstation 107, and can be controlled by authorized personnel of controlled environment 101. It is understood that the organization of files and images in GUI 500 is merely exemplary. Other embodiments that display execution rules and inmate profiles and that allow an administrator to view and manage files are within the scope of the invention.

In some embodiments, GUI 500 can include a graphical representation of execution rules 501 and a graphical representation of inmate profile 502 associated with an inmate of controlled environment 101. The graphical representation of execution rules 501 can further include a graphical representation 510 of the wireless device and containers 511 and 512 associated with the inmate, as well as a graphical representation of file systems 513 and 514 associated with containers 511 and 512. In some embodiments, the graphical representation of inmate profile 502 includes the user content associated with the inmate as well as any administrative restrictions imposed on the inmate by administrators of controlled environment 101.

When GUI 500 is accessed on a workstation, such as workstation 107, that is connected to MMDM 105, information in GUI 500 can be populated based on information stored at MMDM 105. Accordingly, administrators may utilize GUI 500 to generate and/or update execution rules for creating containers on wireless devices of controlled environment and inmate profiles associated with any inmate of controlled environment 101 and push the updated information from MMDM 105 to wireless devices associated with each inmate as necessary.

Exemplary Enterprise Management Operation

Exemplary usage of wireless device enterprise management system 100, wireless device 200, and MMDM 400 in a controlled environment will be described with respect to FIGS. 6-10. The exemplary usage described in FIGS. 6-10 can be performed by processing logic that can comprise hardware (e.g., circuitry, dedicated logic, programmable logic, microcode, etc.), software (e.g., instructions executing on a processing device), or a combination thereof. For illustrative purposes, FIGS. 6-10 are described with respect to FIGS. 1-5 but are not limited to these example embodiments.

Figure 6:
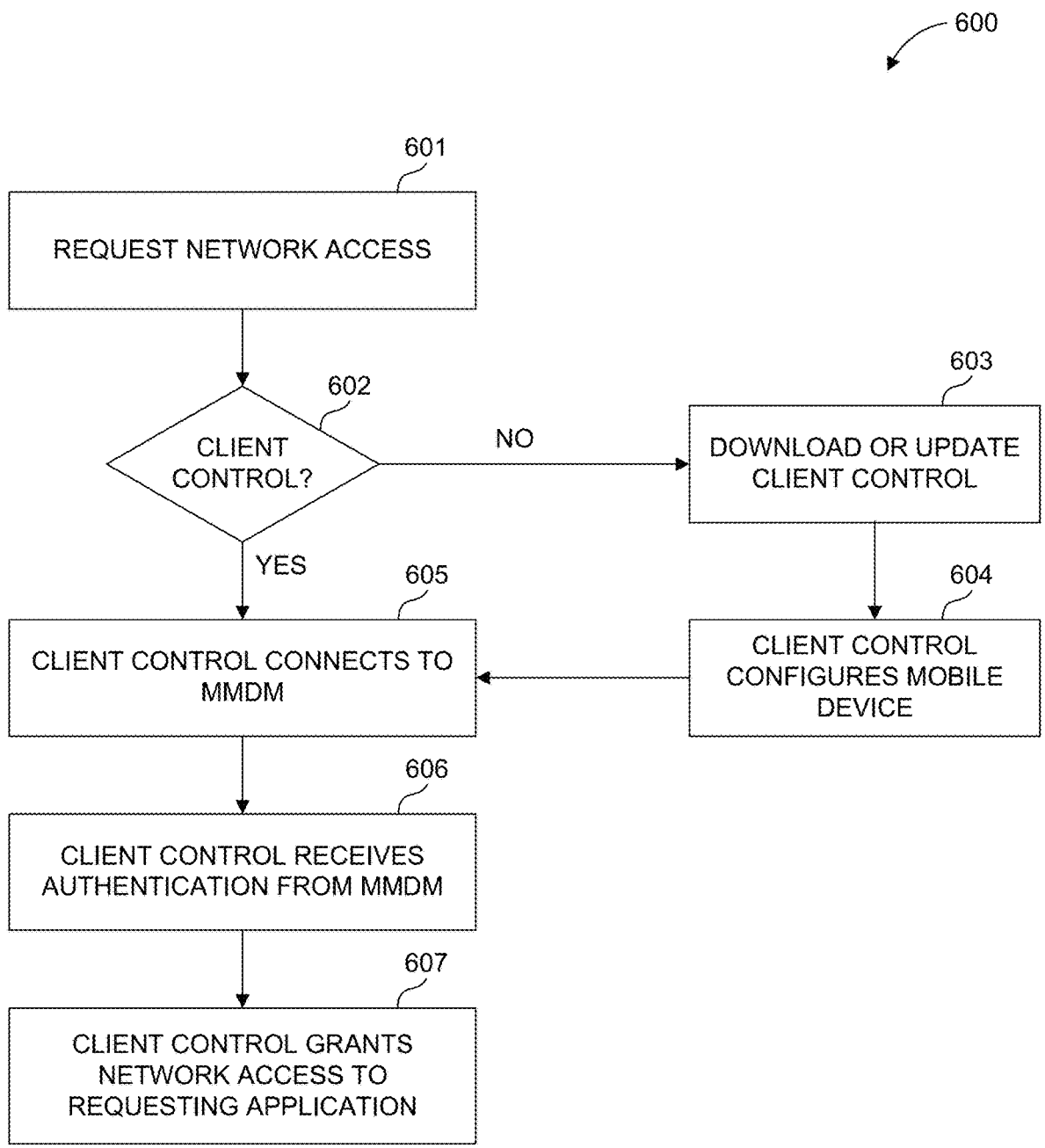
FIG. 6 illustrates a flowchart diagram of an exemplary method for requesting network access in the exemplary wireless device enterprise management system of FIG. 1, according to embodiments of the present disclosure.

FIG. 6 illustrates a flowchart diagram of an exemplary method 600 requesting network access in the exemplary wireless device enterprise management system of FIG. 1, according to embodiments of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 6, as will be understood by a person of ordinary skill in the art. Some steps can be combined and performed as a single step. Method 600 can be performed by BYO wireless device 102 and/or prison-issued wireless device 103 and MMDM 105.

In 601, MMDM 105 receives a request from wireless device 200 to access network within controlled environment 101. In 602, MMDM 105 determines whether wireless device 200 that submitted the request has client control subsystem 233 installed and/or is up-to-date to the most current version. In some embodiments, client control subsystem 233 is required to be installed on any wireless device in order to obtain access to a network within controlled environment 101.

In 603, if client control subsystem 233 is not installed or if current client control subsystem 233 is not the most recent version, wireless device 200 downloads and installs the client control subsystem from MMDM 105. In some embodiments, MMDM 105 pushes client control subsystem 233 to wireless device 200 upon determining that the client control subsystem 233 is not installed.

In 604, after installation, client control subsystem 233 configures the mobile device for use within wireless device enterprise management system 100. Configuring the mobile device includes analyzing wireless device's files and file system and organizing the files into containers based on the inmate profile and execution rules associated with the inmate using wireless device 200.

After configuring wireless device 200 with a container-based file system, client control subsystem connects to MMDM 105 at 605. Connecting to MMDM 105 can include sending a message indicating that wireless device 200 has been configured, that client control subsystem 233 has been properly installed on wireless device, or any other messaging indicating that the wireless device 200 is authorized to access the network. In 606, client control subsystem 233 receives a confirmation from MMDM 105 that wireless device 200 is authenticated. In 607, the client control subsystem 233 allows the requesting file on wireless device 200 to communicate over the network within controlled environment 101 based on the authentication confirmation received from MMDM 105.

Figure 7:
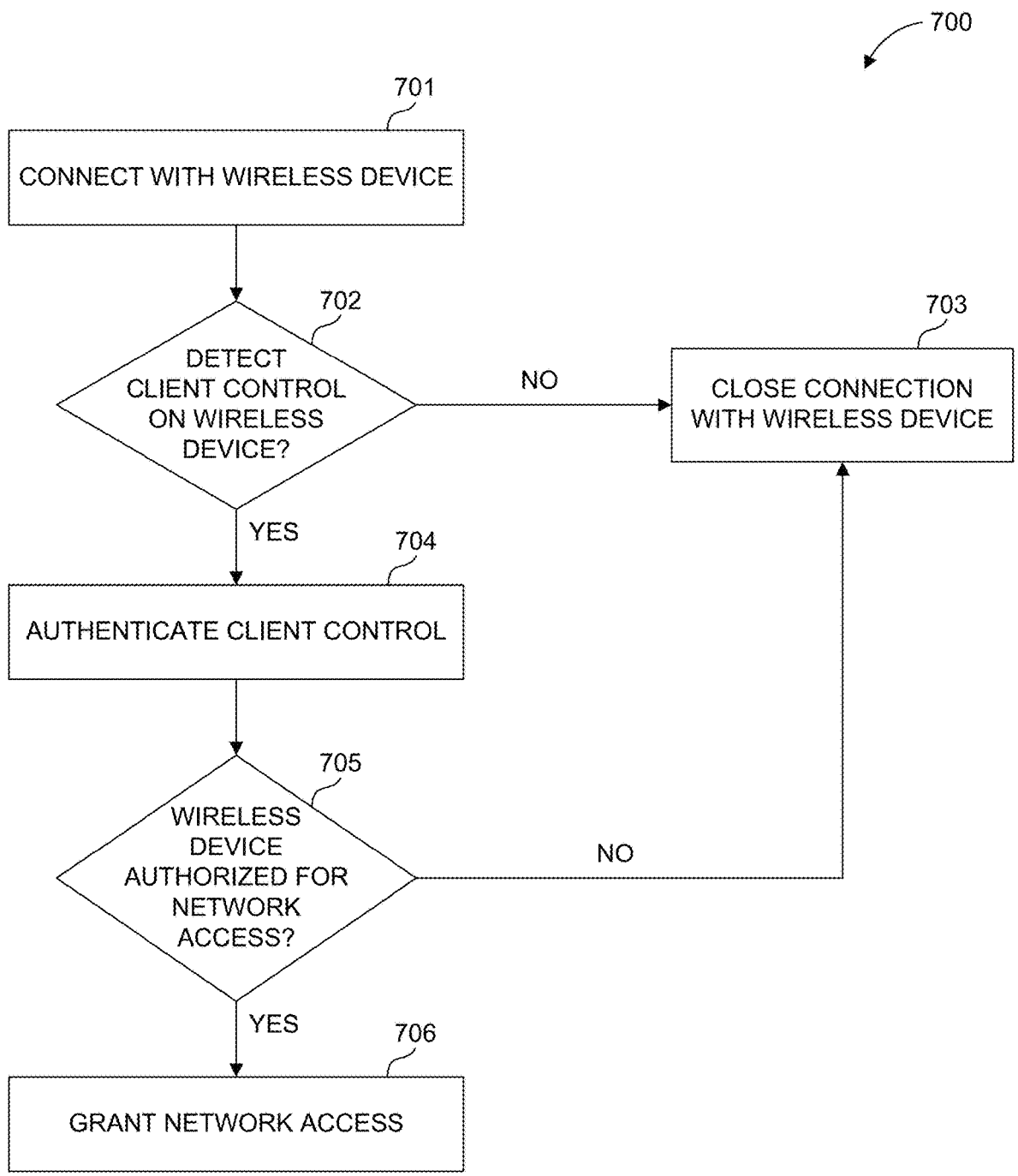
FIG. 7 illustrates a flowchart diagram of an exemplary method for providing network access in the exemplary wireless device enterprise management system of FIG. 1, according to embodiments of the present disclosure.

FIG. 7 illustrates a flowchart diagram of an exemplary method for providing network access in the exemplary wireless device enterprise management system of FIG. 1, according to embodiments of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 7, as will be understood by a person of ordinary skill in the art. Some steps can be combined and performed as a single step. Method 700 can be performed by MMDM 400 in order to determine whether a wireless device can access a network within controlled environment 101.

In 701, MMDM 400 connects to wireless device 200. This connection may initiated by either MMDM 400 or wireless device 200. In some embodiments, execution of a file on wireless device 200 may cause wireless device 200 to transmit a request for next access to MMDM 400. For example, a user may launch a video calling application that requires network access in order to initiate a video call with a person outside of controlled environment 101. The video calling application requires access to a network within controlled environment 101 and therefore needs approval from MMDM 400.

In 702, MMDM 400 determines whether client control subsystem 233 is installed on wireless device 200. For example, MMDM 400 may parse the request from wireless device and determine whether the request was transmitted by client control subsystem 233. Additionally or alternatively, MMDM 400 may transmit a message to client control subsystem 233 and wait for a response that indicates that client control subsystem 233 is installed and operational on wireless device 200.

In 703, if MMDM 400 determines that the client control subsystem is not installed, MMDM 400 closes the connection with wireless device 200 and prevents any transmissions by wireless device 200. In 704, if MMDM 400 determines that the client control subsystem is installed, MMDM 400 authenticates client control subsystem 233 to ensure that it is the most recent version and is working properly (e.g., has not been compromised by a user of wireless device 200).

In 705, MMDM 400 next determines whether wireless device 200 is authorized to access the network. This determination may be based on examining execution rules associated with containers on wireless device 200 and/or an inmate profile associated with the user of wireless device 200. As previously discussed, while execution rules provide conditions with regard to specific files on wireless device 200, the inmate profile provides conditions specific to the inmate. In some embodiments, MMDM 400 parse the request to access the network to determine execution rules based on the information in the request. For example, the request may indicate the type of container in which the file seeking network access is located and/or may indicate the specific execution rules associated with the container. MMDM 400 may then allow or deny access based on the execution rules for the container associated with the network request. Additionally or alternatively, MMDM 400 can also retrieve and analyze the inmate profile associated with the user of wireless device 200. The inmate profile may indicate that the inmate is not allowed to access the network during certain times or is not allowed to use a video calling application during certain times. In 706, MMDM grants network access on the basis of determining whether wireless device 200 is authorized to access the network.

Figure 8:
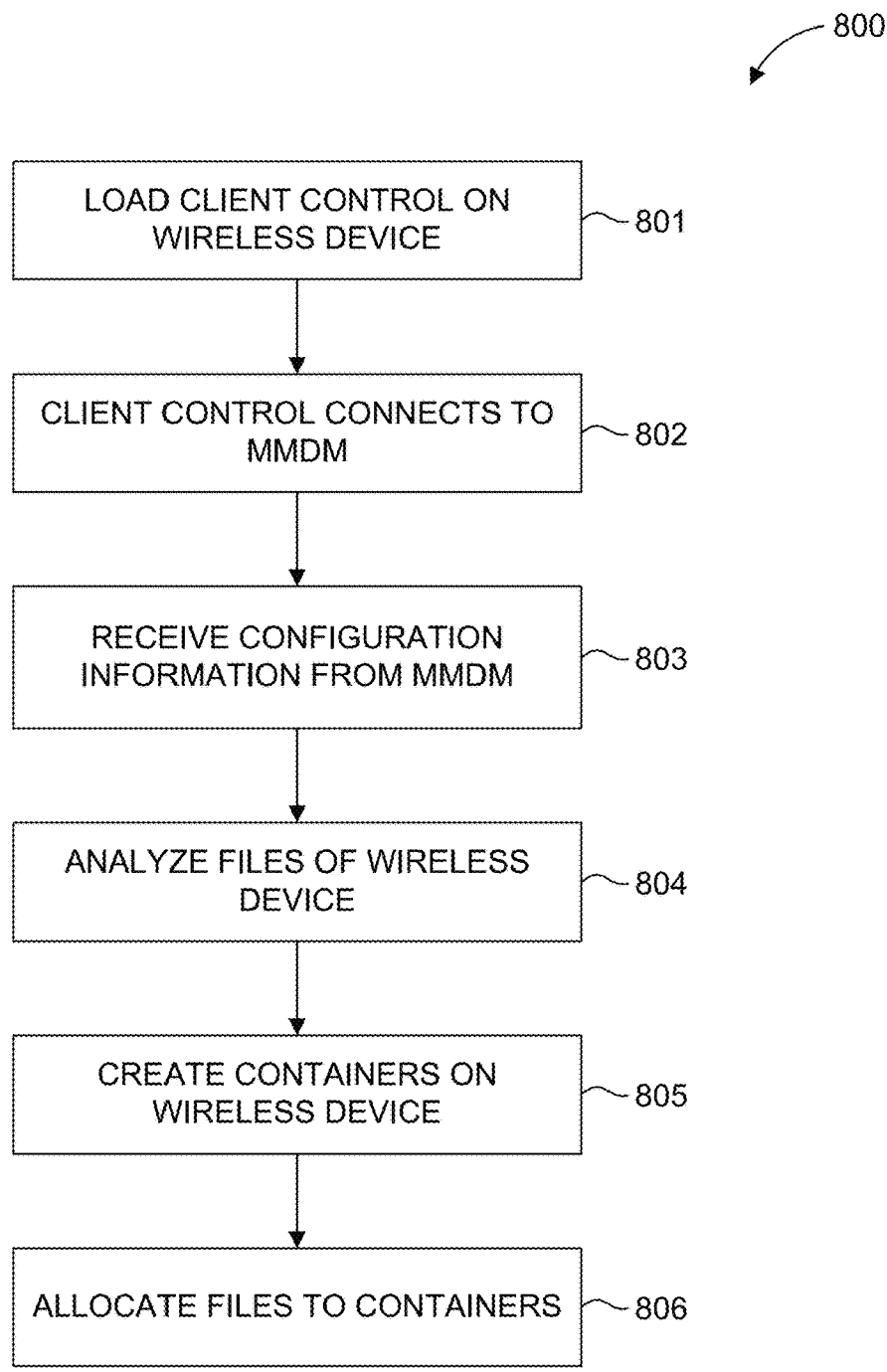
FIG. 8 illustrates a flowchart diagram of an exemplary method for implementing containers in an exemplary wireless device in the exemplary wireless device enterprise management system of FIG. 1, according to embodiments of the present disclosure.

FIG. 8 illustrates a flowchart diagram of an exemplary method for implementing containers in an exemplary wireless device in the exemplary wireless device enterprise management system of FIG. 1, according to embodiments of the present disclosure. Method 800 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 8, as will be understood by a person of ordinary skill in the art. Some steps can be combined and performed as a single step. Method 800 can be performed by BYO wireless device 102 and/or prison-issued wireless device 103 to configure file systems into containers. Configuration performed by client control subsystem 233 may be performed at any time such as upon installation on wireless device 200, after updating to a more recent version, and/or at the request of MMDM 400 and/or administrative personnel of controlled environment 101.

In 801, after installation or updating, client control subsystem 233 is loaded on wireless device 200. In 802, client control subsystem 233 connects to MMDM 400 to obtain configuration information regarding how to configure file systems on wireless device 200. Configuration information includes execution rules which were created by MMDM 400 and/or administrative personnel. For example, execution rules can be created using administrative GUI 500 as described with regard to FIG. 5. Configuration information can also include the inmate's profile that includes administrative restrictions associated with the inmate. Execution rules can also include a list of files that are banned from being executed within controlled environment 101. For example, execution rules can specify that certain video calling applications, browser applications, games, or network applications are to be placed within a locked container with restricted access while wireless device 200 is connected to a network in controlled environment 101.

In 803, client control subsystem 233 receives the configuration information associated with wireless device 200 from MMDM 400. In 804, based on the configuration information, client control subsystem 233 begins analyzing contents of wireless device 200 to identify and organize files currently on wireless device 200. For example, client control subsystem 233 retrieve a list of banned files and allowed files from configuration information and searching for any banned or allowed files located on wireless device 200. In some embodiments, client control subsystem 233 may identify unknown files that are not associated with any execution rules and automatically organize unknown files as banned files until MMDM 400 and/or authorized personnel can later determine the identity of the unknown files.

In 805, based on the configuration information from MMDM 105, client control subsystem 233 creates containers to organize the file system of wireless device 200. As discussed above, containers can be considered groupings from files within a file system of a wireless device. Each group of files share common execution rules which restrict or allow the execution of the files based on certain conditions specified in the execution rules. For example, configuration information may specify that certain files are to be placed in a locked container, certain files are to be placed in an unlocked container, and certain files are to be placed in a limited access container. If client control subsystem 233 identifies files on wireless device 200 that match the files identified in the configuration information, client control subsystem 233 will create the locked container, the unlocked container, and the limited access container. Similarly, if client control subsystem 233 only files associated with the unlocked container and the limited access container, client control subsystem 233 will create only the unlocked container and the limited access container.

In 806, client control subsystem 233 allocates the organized files into the appropriate created containers based on the configuration information. For example, client control subsystem 233 organizes the files identified as banned files into the locked container and files identified as allowed files into the unlocked container.

Figure 9:
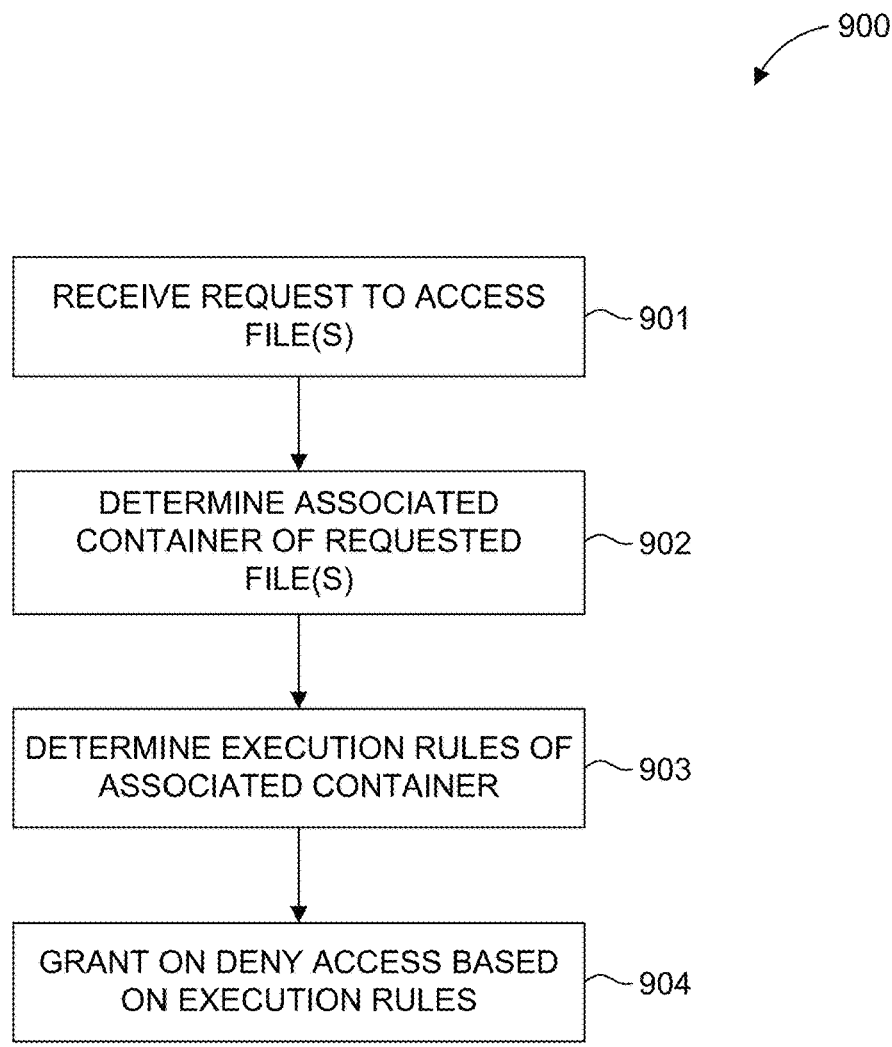
FIG. 9 illustrates a flowchart diagram of an exemplary method for processing a request by a container in the exemplary wireless device enterprise management system of FIG. 1, according to embodiments of the present disclosure.

FIG. 9 illustrates a flowchart diagram of an exemplary method for processing a request by a container in the exemplary wireless device enterprise management system of FIG. 1, according to embodiments of the present disclosure. Method 900 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 9, as will be understood by a person of ordinary skill in the art. Some steps can be combined and performed as a single step. Method 900 can be performed by BYO wireless device 102 and/or prison-issued wireless device 103. Method 900 describes steps related to determining whether a user may access content on wireless device 200.

In 901, client control subsystem 233 receives a request from a user of wireless device 200 to access files located on wireless device 200. For example, a user may load a music application on wireless device 200 and is requesting access to a certain song. In 902, client control subsystem 233 determines the container associated with the requested files.

In 903, client control subsystem 233 determines the execution rules of the associated container. In 904, based on the execution rules of the associated container, client control subsystem 233 determines whether to grant or deny access to the requested files.

Figure 10:
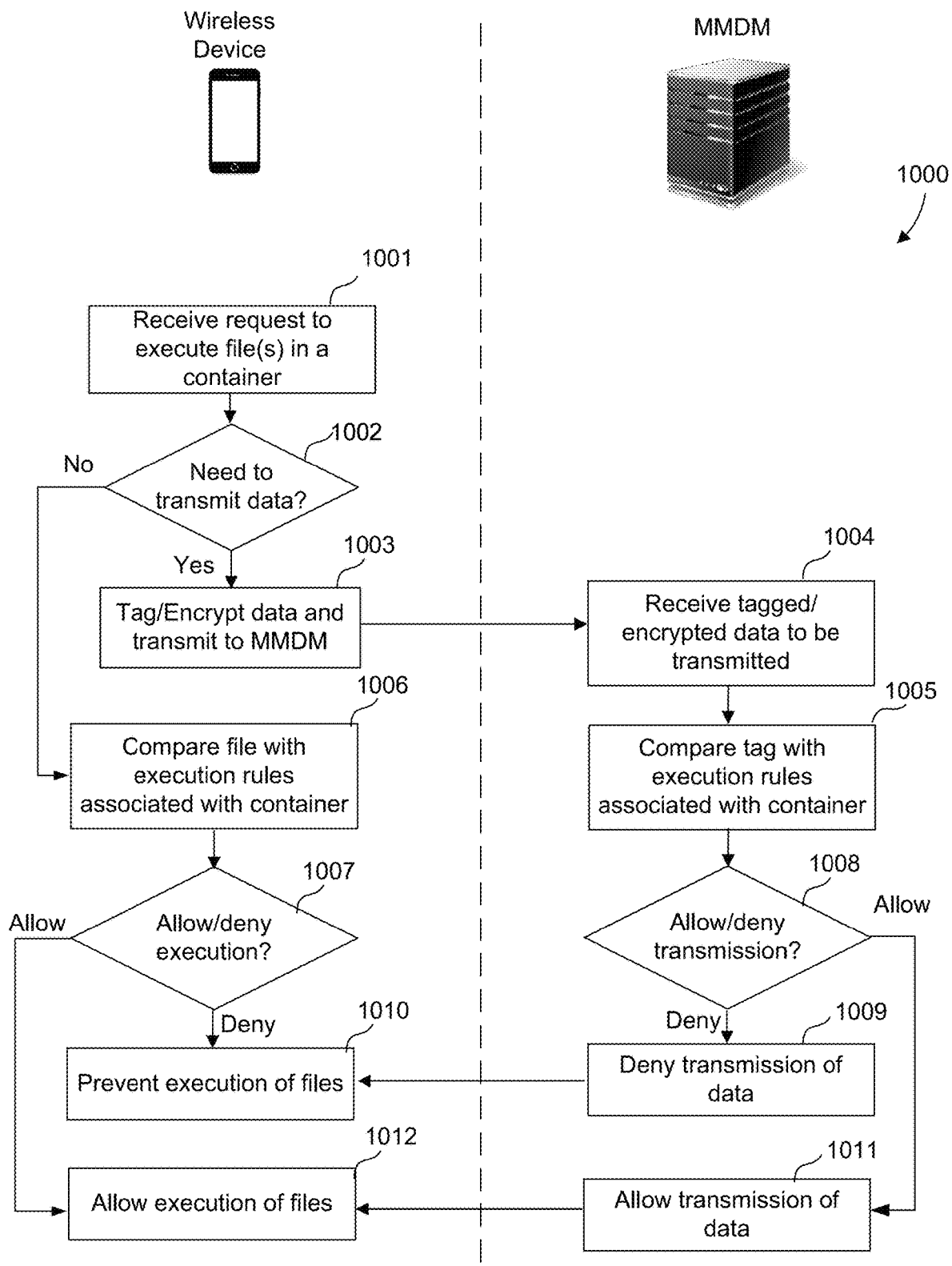
FIG. 10 illustrates a flowchart diagram of an exemplary method for enforcing execution rules in the exemplary wireless device enterprise management system of FIG. 1, according to embodiments of the present disclosure.

FIG. 10 illustrates a flowchart diagram of an another exemplary method 1000 for processing a request by a container in the exemplary wireless device enterprise management system of FIG. 1, according to embodiments of the present disclosure. Method 1000 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 10, as will be understood by a person of ordinary skill in the art. Some steps can be combined and performed as a single step. Method 1000 can be performed by wireless device 200 and MMDM 400.

In 1001, client control subsystem 233 receives a request from a user of wireless device 200 to execute a file or files located in a container on wireless device 200. In 1002, client control subsystem 233 determines whether execution of the requested file requires transmitting data over a network. For example, a game, such as solitaire, may not require transmission of any data while a video calling application would require transmission of video data to and from wireless device 200.

In 1003, client control subsystem 233 determines that execution of the requested file requires transmission of data and tags the data to be transmitted. Tagging the data includes, for example, including an identifier of client control subsystem 233, identifiers of execution rules associated with the container, and/or an identifier of the container in which the requested file is located on wireless device 200. In some embodiments, client control subsystem 233 can also encrypt the data prior to transmission to MMDM 400. Client control subsystem 233 transmits the tagged and/or encrypted data to MMDM 400.

In 1004, MMDM 400 receives the tagged data. In 1005, based on the tag, MMDM 400 identifies the container associated with the requested file and determines the execution rules associated with the container. Based on the execution rules associated with the container, MMDM 400 determines whether to allow or deny transmission of the data in 1008. For example, execution rules may specify that the requested file is located in a limited access container and the conditions for executing the file, such as a particular time of day, are or are not currently met.

In 1009, MMDM 400 denies transmission of data as determined by the execution rules and sends a signal to client control subsystem to prevent execution of the requested file in 1010. In 1011, MMDM 400 allows transmission of data and sends a signal to client control subsystem to allow execution of the requested file in 1012. If client control subsystem 233 had previously encrypted the data prior to transmission to MMDM 400, MMDM will decrypt the data prior to transmission over the network.

In 1006, client control subsystem 233 determines that execution of the requested file does not require transmission of data. Client control subsystem 233 determines the execution rules of the container and compares the file with the execution rules. In 1007, client control subsystem 233 determines whether to allow or deny execution of the requested file. In 1010, client control subsystem 233 determines that the execution rules prevent execution of the requested file and prevents execution of the file. In 1012, client control subsystem 233 determines that the execution rules allow execution of the requested file and allows execution of the file.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 11:
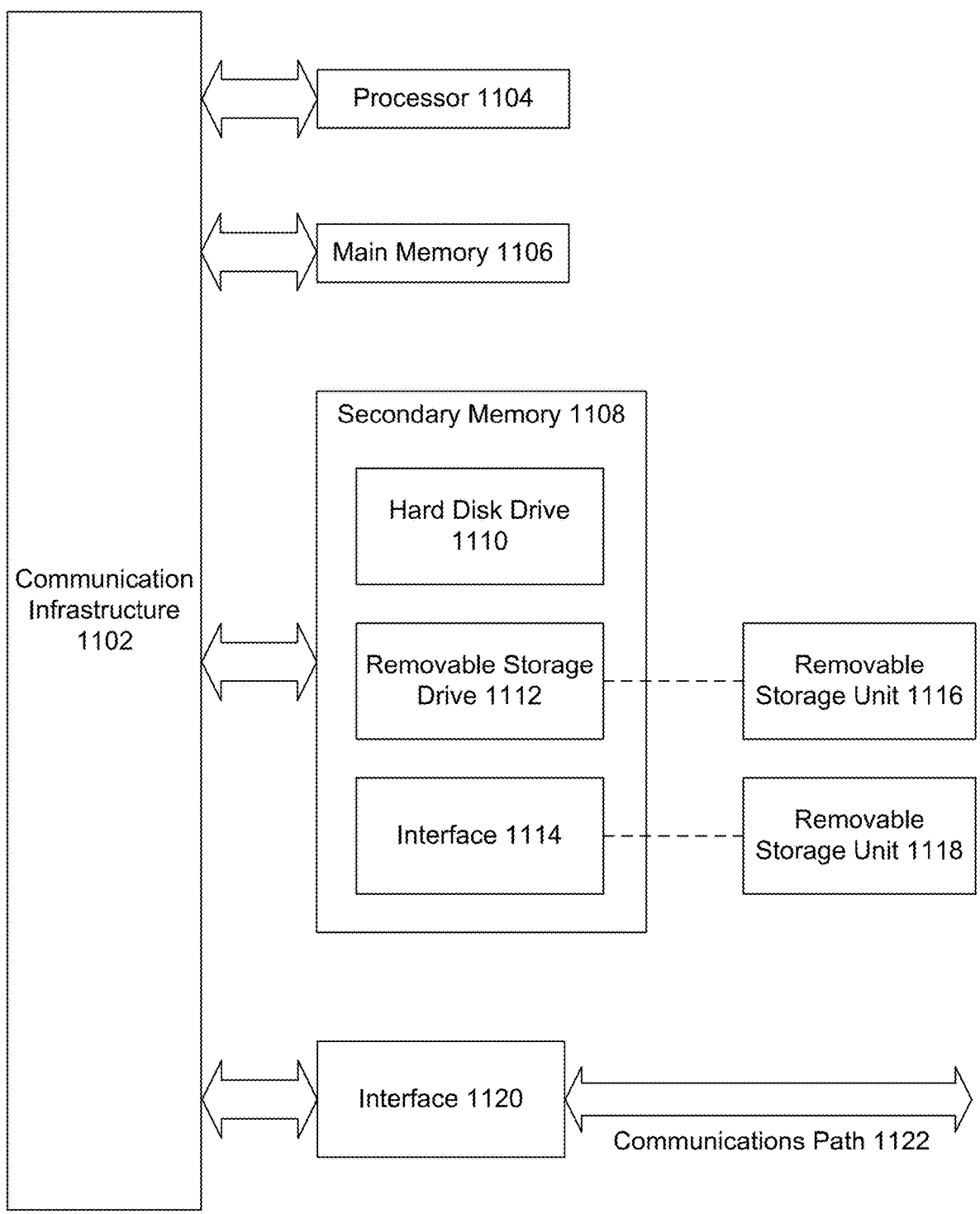
FIG. 11 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 7-10 can be implemented in the environment of one or more computer systems or other processing systems. An example of such a computer system 1100 is shown in FIG. 11. One or more of the modules depicted in the previous figures can be at least partially implemented on one or more distinct computer systems 1100.

Computer system 1100 includes one or more processors, such as processor 1104. Processor 1104 can be a special purpose or a general purpose digital signal processor. Processor 1104 is connected to a communication infrastructure 1102 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1100 also includes a main memory 1106, preferably random access memory (RAM), and may also include a secondary memory 1108. Secondary memory 1108 may include, for example, a hard disk drive 1110 and/or a removable storage drive 1112, representing a floppy disk drive, a magnetic tape drive, an optical disk drive, or the like. Removable storage drive 1112 reads from and/or writes to a removable storage unit 1116 in a well-known manner. Removable storage unit 1116 represents a floppy disk, magnetic tape, optical disk, or the like, which is read by and written to by removable storage drive 1112. As will be appreciated by persons skilled in the relevant art(s), removable storage unit 1116 includes a computer usable storage medium having stored therein computer software and/or data.

In alternative implementations, secondary memory 1108 may include other similar means for allowing computer programs or other instructions to be loaded into computer system 1100. Such means may include, for example, a removable storage unit 1118 and an interface 1114. Examples of such means may include a program cartridge and cartridge interface (such as that found in video game devices), a removable memory chip (such as an EPROM, or PROM) and associated socket, a thumb drive and USB port, and other removable storage units 1118 and interfaces 1114 which allow software and data to be transferred from removable storage unit 1118 to computer system 1100.

Computer system 1100 may also include a communications interface 1120. Communications interface 1120 allows software and data to be transferred between computer system 1100 and external devices. Examples of communications interface 1120 may include a modem, a network interface (such as an Ethernet card), a communications port, a PCMCIA slot and card, etc. Software and data transferred via communications interface 1120 are in the form of signals which may be electronic, electromagnetic, optical, or other signals capable of being received by communications interface 1120. These signals are provided to communications interface 1120 via a communications path 1122. Communications path 1122 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1116 and 1118 or a hard disk installed in hard disk drive 1110. These computer program products are means for providing software to computer system 1100.

Computer programs (also called computer control logic) are stored in main memory 1106 and/or secondary memory 1108. Computer programs may also be received via communications interface 1120. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1112, interface 1114, or communications interface 1120.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Conclusion

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for configuring a wireless device within a controlled environment, comprising:

receiving configuration information from an enterprise management server associated with the controlled environment;

creating a first container in a first unlocked file system of the wireless device and a second container in a second unlocked file system of the wireless device based on the configuration information, wherein the first container is associated with a first execution rule that specifies a first condition regarding execution of a first file located within the first container and the second container is associated with a second execution rule that specifies a second condition regarding execution of a second file located within the second container;

receiving a request to execute the first file or the second file;

transmitting the request and associated data to the enterprise management server;

receiving a signal from the enterprise management server, wherein the signal comprises an instruction allowing or denying execution of the first file or the second file, wherein the first unlocked file system is configured to include first files, including the first file, that are owned by the enterprise management server and the second unlocked file system is configured to include second files, including the second file, that are owned by a user of the wireless device; and receiving the first execution rule and the second execution rule from the enterprise management server.

2. The method of claim 1, wherein the first condition includes at least one of a time-based restriction and a usage-based restriction regarding the execution of the first file.

3. The method of claim 1, wherein the configuration information identifies the second file as being banned from execution by the controlled environment.

4. The method of claim 1, further comprising: determining the first execution rule associated with the first container and the second execution rule associated with the second container, wherein the configuration information includes the first execution rule and the second execution rule.

5. The method of claim 1, further comprising: creating a third container in a first locked file system of the wireless device and a fourth container in a second locked file system of the wireless device based on the configuration information, wherein the third container is associated with a third execution rule that specifies a third condition regarding execution of a third file located within the third container and the fourth container is associated with a fourth execution rule that specifies a fourth condition regarding execution of a fourth file located within the fourth container.

6. The method of claim 5, wherein the first locked file system is configured to include a plurality of third files, including the third file, that are owned by the enterprise management server and the second locked file system is configured to include a plurality of fourth files, including the fourth file, that are owned by a user of the wireless device.

7. A non-transitory computer-readable medium having instructions stored therein, which when executed by a processor in a wireless device, cause the processor to perform operations, the operations comprising:

receiving configuration information from an enterprise management server associated with a controlled environment;

creating a first container in a first unlocked file system of the wireless device and a second container in a second unlocked file system of the wireless device based on the configuration information, wherein the first container is associated with a first execution rule that specifies a first condition regarding execution of a first file located within the first container and the second container is associated with a second execution rule that specifies a second condition regarding execution of a second file located within the second container;

receiving a request to execute the first file or the second file;

transmitting the request and associated data to the enterprise management server;

receiving a signal from the enterprise management server, wherein the signal comprises an instruction allowing or denying execution of the first file or the second file, wherein the first unlocked file system is configured to include first files, including the first file, that are owned by the enterprise management server and the second unlocked file system is configured to include second files, including the second file, that are owned by a user of the wireless device; and receiving the first execution rule and the second execution rule from the enterprise management server.

8. The non-transitory computer-readable medium of claim 7, wherein the first condition includes at least one of a time-based restriction or a usage-based restriction regarding the execution of the first file.

9. The non-transitory computer-readable medium of claim 7, wherein the configuration information identifies the second file as being banned from execution by the controlled environment.

10. The non-transitory computer-readable medium of claim 7, the operations further comprising: determining the first execution rule associated with the first container and the second execution rule associated with the second container, wherein the configuration information includes the first execution rule and the second execution rule.

11. The non-transitory computer-readable medium of claim 7, the operations further comprising:

creating a third container in a first locked file system of the wireless device and a fourth container in a second locked file system of the wireless device based on the configuration information, wherein the third container is associated with a third execution rule that specifies a third condition regarding execution of a third file located within the third container and the fourth container is associated with a fourth execution rule that specifies a fourth condition regarding execution of a fourth file located within the fourth container.

12. The non-transitory computer-readable medium of claim 11, wherein the first locked file system is configured to include a plurality of third files, including the third file, that are owned by the enterprise management server and the second locked file system is configured to include a plurality of fourth files, including the fourth file, that are owned by the user of the wireless device.

13. A wireless device in a controlled environment, comprising:

a memory; and a processor coupled to the memory, the processor configured to:

receive configuration information from an enterprise management server associated with the controlled environment;

create a first container in a first unlocked file system of the wireless device and a second container in a second unlocked file system of the wireless device based on the configuration information, wherein the first container is associated with a first execution rule that specifies a first condition regarding execution of a first file located within the first container and the second container is associated with a second execution rule that specifies a second condition regarding execution of a second file located within the second container;

receive a request to execute the first file or the second file;

transmit the request and associated data to the enterprise management server;

receive a signal from the enterprise management server, wherein the signal comprises an instruction allowing or denying execution of the first file or the second file, wherein the first unlocked file system is configured to include first files, including the first file, that are owned by the enterprise management server and the second unlocked file system is configured to include second files, including the second file, that are owned by a user of the wireless device; and receive the first execution rule and the second execution rule from the enterprise management server.

14. The wireless device of claim 13, wherein the processor is further configured to: create a third container in a first locked file system of the wireless device and a fourth container in a second locked file system of the wireless device based on the configuration information, wherein the third container is associated with a third execution rule that specifies a third condition regarding execution of a third file located within the third container and the fourth container is associated with a fourth execution rule that specifies a fourth condition regarding execution of a fourth file located within the fourth container.

15. The wireless device of claim 14, wherein the first locked file system is configured to include a plurality of third files, including the third file, that are owned by the enterprise management server and the second locked file system is configured to include a plurality of fourth files, including the fourth file, that are owned by the user of the wireless device.

* * * * *